United States Patent [19]
Arikawa et al.

[11] Patent Number: 6,147,934
[45] Date of Patent: Nov. 14, 2000

[54] DISPLAY DEVICE AND ELECTRONIC WATCH

[75] Inventors: Yasuo Arikawa, Chino; Eiichi Miyazawa; Tomoaki Hirakawa, both of Suwa, all of Japan

[73] Assignee: Seiko Epson Corporation, Tokyo, Japan

[21] Appl. No.: 09/092,865

[22] Filed: Jun. 8, 1998

[30] Foreign Application Priority Data

| Jun. 9, 1997 | [JP] | Japan | 9-150956 |
| Aug. 4, 1997 | [JP] | Japan | 9-209473 |
| Aug. 4, 1997 | [JP] | Japan | 9-209474 |
| Dec. 24, 1997 | [JP] | Japan | 9-355733 |
| May 8, 1998 | [JP] | Japan | 10-126441 |

[51] Int. Cl.$^7$ .......................... G04C 19/00; G02F 1/335; G02B 5/30; G02B 27/28

[52] U.S. Cl. .............................. 368/84; 368/242; 349/96; 359/487; 359/497; 359/500

[58] Field of Search ................. 368/82, 84, 239, 368/242; 349/62, 96; 359/485–500

[56] References Cited

U.S. PATENT DOCUMENTS 4,239,349  12/1980  Scheffer ................................. 350/347

FOREIGN PATENT DOCUMENTS

| WO 95/17303 | 6/1995 | WIPO . |
| WO 95/17691 | 6/1995 | WIPO . |
| WO 95/17692 | 6/1995 | WIPO . |
| WO 97/17699 | 6/1995 | WIPO . |
| WO 95/27919 | 10/1995 | WIPO . |
| WO 96/19347 | 6/1996 | WIPO . |
| WO 97/01439 | 1/1997 | WIPO . |
| WO 97/01440 | 1/1997 | WIPO . |
| WO 97/01610 | 1/1997 | WIPO . |
| WO 97/01726 | 1/1997 | WIPO . |
| WO 97/01774 | 1/1997 | WIPO . |
| WO 97/01778 | 1/1997 | WIPO . |
| WO 97/01780 | 1/1997 | WIPO . |
| WO 97/01781 | 1/1997 | WIPO . |
| WO 97/01788 | 1/1997 | WIPO . |
| WO 97/01789 | 1/1997 | WIPO . |
| WO 97/07653 | 2/1997 | WIPO . |

*Primary Examiner*—Vit Miska
*Attorney, Agent, or Firm*—Oliff & Berridge, PLC

[57] ABSTRACT

In a display device used in an electronic watch or the like, information such as numeric characters or the like and a background are bright and easily displayed. In addition, various information is provided to a viewer, and attracting the viewer's interest is facilitated. The display device includes components of a polarizer, a liquid crystal panel and a polarization separation film. The polarization separation film has a function of transmitting linearly polarized light in one direction and of reflecting other linearly polarized light. A pattern such as a logo, a mark, a character or the like is formed by printing on a light-reflecting layer provided at the back of the polarization separation film. Information such as numeric characters or the like is not displayed as a background of a single color with no pattern, but after rendering a pattern such as a character or the like a background, both information such as numeric characters or the like and the background can be displayed simultaneously.

31 Claims, 21 Drawing Sheets

DISPLAY DEVICE AND ELECTRONIC WATCH

BACKGROUND OF THE INVENTION

1. Field of Invention

The present invention relates to a display device for displaying characters, numeric characters, patterns and so forth. In addition, the present invention relates to an electronic watch such as a wristwatch, a stopwatch and so forth for counting and displaying time.

2. Description of Related Art

Display devices for displaying numeric characters, characters and other information using a flat display device such as a liquid crystal display device have been widely known. In one such display device, as shown in FIG. 28 for example, as conventionally known, a pair of polarizers 102 and 103 are placed on both sides, respectively, of a liquid crystal panel 101, and a reflecting plate 104 is provided on the back of polarizer 103. The pair of polarizers 102 and 103 are placed so that, for example, the transmitted polarization axes form a right angle.

According to this conventional display device, display of information such as numeric characters or the like is effected by applying a predetermined voltage between electrodes of the liquid crystal panel 101. A region to which the voltage is not applied is a background of white or the like. In FIG. 28, the region to which the voltage is applied for displaying information is represented as "ON", and the background region to which the voltage is not applied is represented as "OFF".

In this display device, when the background is displayed (that is, the liquid crystal panel 101 is OFF), as shown by the arrow P, linearly polarized light of external light, i.e., natural light in the direction parallel to the plane of the drawing is transmitted by the polarizer 102. The polarization direction is twisted 90° by the liquid crystal panel 101 in the OFF state to be changed to linearly polarized light in the direction perpendicular to the plane of the drawing. This linearly polarized light is irregularly reflected from the surface of the reflecting plate 104 after being transmitted by the polarizer 103. Then, a part of the irregular reflected light is displayed to the outside after being sequentially transmitted by the polarizer 103, the liquid crystal panel 101 and the polarizer 102. That part of the irregular reflected light is recognized as a reflection image of the reflecting plate 104, and normally, as a uniform white background.

When information such as numeric characters is displayed (that is, the liquid crystal panel 101 is ON), as shown by the arrow Q, linearly polarized light in the direction parallel to the plane of the drawing is taken out of the external light by the polarizer 102, and the linearly polarized light is transmitted by the liquid crystal panel 101. Since the liquid crystal panel is in the ON state at this time, the polarization direction of the linearly polarized light maintains the direction parallel to the plane of the drawing without being twisted. Therefore, the linearly polarized light is absorbed by the polarizer 103. Consequently, this portion is recognized from the outside as a dark color such as black.

According to the foregoing description, in this conventional display device, information such as numeric characters is displayed in a dark color, such as black, on the reflection image from the reflecting plate 104, which is a normally uniform white background.

In the above conventional display device, since two sheets of the polarizers 102 and 103 are respectively provided on both sides of the liquid crystal panel 101 and these polarizers have a function of absorbing linearly polarized light having a polarization axis other than a predetermined polarization axis, intensity of light guided to the outside for displaying information such as a background color and numeric characters and so forth is attenuated greatly. Therefore, there is a problem in that information such as numeric characters and the background are dark and hard to view.

In addition, since the background in the conventional display device is dark, even if various colors, patterns and other designs are added to the background, the patterns and so forth cannot be clearly recognized. Therefore, in the conventional display device, almost all of the backgrounds are displayed only in a single color such as white.

A conventional electronic watch has also been known having a structure such that a backlight is provided in place of a light-reflecting plate. According to the thus structured electronic watch, one of two forms can be selected to effect display: using the surface of the backlight as a light-reflecting layer, and using emitted light from the backlight. Usually, a reflection-type display form is selected during bright daytime, while a display form using the backlight is selected during dark nighttime.

In the above conventional electronic watch, however, there is a problem in that clocking contents of the electronic watch cannot be viewed under a dark environment such as nighttime and the like.

In addition, according to the above conventional electronic watch using the backlight, the backlight is large in size and a power source is required. Thus, there is a problem in that the electronic watch becomes large in size which causes inconvenience in handling and increase in cost.

SUMMARY OF THE INVENTION

The present invention is made in consideration of the above problems in the conventional display device. A first object of the present invention is to enable both information such as numeric characters or the like and a background to be displayed in a remarkably bright and easy-to-see state, and to vary the background to provide a variety of information to the viewer.

The present invention is also made in consideration of the above problems in the conventional electronic watch. A second object of the present invention is to provide an electronic watch which enables the contents of the clock display surface to be viewed even under a dark environment of nighttime. Such provision can reduce the size of the electronic watch and moreover, can be low in cost.

According to the above description, a display device and an electronic watch may have a structure such that a polarization changing element such as the liquid crystal panel 101 is sandwiched between two sheets of polarization separators. The first object of the present invention is to display both information such as numeric characters and a background in a remarkably bright and easy-to-see state, and to vary the background. In addition, the present inventors have made an intensive effort to achieve a similar object by contriving the number of polarization separators and way of arrangement thereof. A third object of the present invention is to display both information such as numeric characters and a background in a remarkably bright and easy-to-see state and to vary the background by increasing the number of polarization separators which are placed across the polarization changing element.

A display device according to the present invention may include: a first polarization separator which transmits linearly polarized light polarized in one direction and which does not transmit other linearly polarized light; a polarization changing element which is placed at the position receiving the linearly polarized light emitted from the first polarization separator, and which is capable of selecting one of a changing state and a non-changing state of the polarization axis of the transmitted polarized light; a second polarization separator which is placed opposite to the above first polarization separator with the polarization separating element in between, and which transmits linearly polarized light in one direction and reflects other linearly polarized light; and a light-reflecting layer which is placed on the opposite side of the above polarization separating element across the second polarization separator to reflect light. The light-reflecting layer includes a pattern on a light-reflecting surface.

An electronic watch according to the present invention may include: a first polarization separator which transmits linearly polarized light polarized in one direction and which does not transmit other linearly polarized light; a polarization changing element which is placed at the position receiving the linearly polarized light emitted from the first polarization separator, and which is capable of selecting one of a changing state and a non-changing state of the polarization axis of the transmitted polarized light; a second polarization separator which is placed opposite to the above first polarization separator with the polarization changing element in between, and which transmits linearly polarized light in one direction and reflects other linearly polarized light; and a light-reflecting layer which is placed on the opposite side of the above polarization changing element across the second polarization separator to reflect light. The light-reflecting layer includes a pattern on a light-reflecting surface.

In the above arrangements, the first polarization separator can be formed by a normal polarizer. The normal polarizer is a film-like member having a function of emitting linearly polarized light in one direction with respect to the incidence of natural light, and can be formed by, for example, sandwiching a polarization layer by protective layers of TAC (cellulose triacetate).

The above polarization changing element can be formed by, for example, using a liquid crystal panel. As the liquid crystal, various types of liquid crystals, such as a TN (Twisted Nematic) liquid crystal, an STN (Super-Twisted Nematic) liquid crystal, an ECB (Electrically Controlled Birefringence) liquid crystal and so forth can be employed. Incidentally, in the STN liquid crystal, an STN liquid crystal using a color compensating optical anisotropic body, such as an F-STN (Film Compensated Super-Nematic) liquid crystal or the like is included.

The above second polarization separator can be formed by employing (1) a polarization separation film having a structure such that many thin films are laminated, as disclosed in an international-published international application (International Publication No. WO95/17692 or WO95/27919), (2) a polarization separation plate having a structure such that a $\lambda/4$ phase plate is provided on both sides or on one side of a cholesteric liquid crystal layer, (3) a polarization separation member (pages 427 to 429 of SID 92 DIGEST) having a structure for separating into reflected polarized light and transmitted polarized light utilizing Brewster angle, or (4) a polarization separation member utilizing a hologram.

Features of the display device and the electronic watch constructed as described above according to the present invention are as follows.

(A) The second polarization separator above-described is provided in place of a polarizer provided on the back of a polarization changing element in the conventional electronic watch; and further (B) A suitable pattern is provided on the surface of a light-reflecting layer provided on the back of the second polarization separator.

While a general polarizer has a function of transmitting linearly polarized light facing one direction and of not transmitting other polarized light, the second polarization separator employed in the present invention has a function of transmitting linearly polarized light of one direction and of reflecting other linearly polarized light, in particular, of totally reflecting the linearly polarized light in the direction perpendicular to a transmitted polarization axis.

Therefore, if the second polarization separator constructed as described above is used in place of the normal polarizer and so forth like the above feature (A), the light, which has been conventionally absorbed or dispersed by the polarizer, can be contributed to a display by reflection. Thus, a background or information such as numeric characters or the like of the display device and the electronic watch can be remarkably brightly displayed.

In particular, when the light-reflecting layer is provided on the back of the second polarization separator like the above feature (B), if the second polarization separator is formed by a normal polarizer in a conventional manner, reflected light from the light-reflecting layer is absorbed by the polarizer. Therefore, the reflected light of sufficient quantity cannot be provided to a viewer.

In contrast, if a polarization separation component of a type for reflecting, not absorbing, linearly polarized light component other than linearly polarized light of a predetermined direction is employed for the above second polarization separator of the present invention, the reflected light from the light-reflecting layer is repeatedly reflected between the second polarization separator and the light-reflecting layer until it matches the transmitted polarization axis of the second polarization separator. When the polarization axis finally matches the polarization axis of the second polarization separator, it passes therethrough to reach the viewer. In other words, quantity of reflected light, which has been conventionally wastefully consumed by absorption, can be efficiently provided to the viewer and consequently, the pattern provided on the light-reflecting layer can be provided to the viewer with sufficient quantity of light.

The reflected light from the light-reflecting layer can be used for displaying information such as numeric characters or the like, or for displaying the background depending on setting of the polarization axes of each of the components of the first polarization separator, the polarization changing element and the second polarization separator. When this reflected light from the light-reflecting layer is used for displaying the background, if a suitable pattern is formed on the light-reflecting layer, the background can be varied, whereby various information other than information such as numeric characters or the like can be provided to the viewer. Moreover, the viewer's interest can be strongly attracted.

In the above electronic watch, the above pattern provided on the light-reflecting layer can be formed on the light-reflecting layer by printing. The pattern can also be formed on the light-reflecting layer by laminating a sheet material having a pattern formed thereon on the light-reflecting layer. If the pattern is directly formed on the light-reflecting layer by printing, only a small number of components are required and an assembly step of the electronic watch or the like can be simplified.

In the above electronic watch, as the above pattern provided on the light-reflecting layer, (1) an expression composed of one or several words having a definite meaning such as a name of company, a name of product or the like, a so-called logo, (2) a mark such as a trademark, an emblem or the like, and (3) a person, an animal and other suitable characters may be considered. This can provide various information to the viewer as compared with a case where a meaningless pattern is provided.

In the above electronic watch, the light-reflecting layer may include a fluorescent material. This fluorescent material may be a light-accumulative fluorescent material of a type capable of accumulating light. If the fluorescent material is included in the light-reflecting layer, the pattern provided on the light-reflecting layer can be recognized by the viewer as if it raises from the background. Thus, a strong impression is made on the viewer.

In the above electronic watch, the first polarization separator may be rotatable in relation to the polarization changing element. This allows the transmitted polarization axis of the first polarization separator to be changed in a desired direction as necessary, so that a display form of the electronic watch can be varied. For example, a display form for turning off the background pattern such as a character or the like to display only information such as numeric characters or the like, and a display form for displaying simultaneously both the background pattern such as a character or the like and information such as numeric characters or the like can be freely selected as necessary.

When the first polarization separator is constructed so as to be rotatable in relation to the polarization changing element, a casing for surrounding the first polarization separator, the polarization changing element, the second polarization separator, the light-reflecting layer, and a rotary ring rotatably mounted to the casing are provided. The first polarization separator is constructed so as to be integrally rotated with the rotary ring. If thus constructed, the viewer rotates the rotary ring from the outside of the electronic watch or the like, whereby the first polarization separator can be rotated so as to change the direction of the polarization axis.

In the above electronic watch, the light-reflecting layer may be movable in relation to the second polarization separator. This allows the pattern provided to the viewer to be varied by moving the light-reflecting layer. Consequently, more various information can be provided to the viewer and the viewer's interest can be further attracted.

The structure for moving the light-reflecting layer is not limited to a specific structure. For example, in a state where an elongated light-reflecting layer is looped over take-up reels, a part of the elongated light-reflecting layer is placed on the back of the second polarization separator to display it as a background. The take-up reels are rounded to carry another part of the light-reflecting layer onto the back position whereby the background can be changed to another pattern.

In the above electronic watch, the second polarization separator can be formed by various polarization separators, as described above. Preferably, however, the second polarization separator is formed using a polarization separation film having a structure disclosed in the international-published international application (International Publication No. WO95/17692 or WO95/27919). This polarization separation film has, as shown in FIG. 2 for example, a structure of a plurality of layers formed by alternately laminating two kinds of layers A and B, and of these layers A and B, in two adjacent layers in relation to a lamination direction. A refractive index in one direction is set to be equal between these two layers and a refractive index in a direction perpendicular thereto is set to be different between these two layers. The thicknesses of respective layers are varied.

In FIG. 2, when a rectangular three-axis direction of XYZ is considered, layers of A and B are formed in a multilayer state by extrusion and further, drawn out in one direction (for example, the X direction) and not drawn out in another one direction (for example, the Y direction). That is, the X-axis direction is a drawing direction, and the Y-axis direction is a lateral direction. Material B has a refractive index $n_B$ (for example, $n_B=1.64$), and it is not substantially changed by drawing. On the other hand, material A has characteristics such that a refractive index is changed by drawing. For example, if a sheet formed of the material A is drawn out in the direction of one axis, the sheet has one refractive index $n_{AX}$ (for example, $n_{AX}=1.88$) in the drawing direction (that is, the X direction) and has a different refractive index $n_{AY}$ (for example, $n_{AY}=1.64$) in a lateral direction (that is, the Y direction).

If the lamination structure of FIG. 2 formed of the materials A and B is drawn out in the X direction, a large refractive index difference $\Delta n=1.88-1.64=0.24$ is produced in the drawing direction. On the other hand, in the Y direction perpendicular thereto, the refractive index difference $\Delta n$ between layers A and B$=1.64-1.64=0$, and no refractive index difference is produced. Because of such optical characteristics, if light is incident on a polarization separation film 12 of the present invention, of the incident light, a polarized light component (a) in the direction of a transmission axis E is transmitted by the polarization separation film 12. On the other hand, a polarized light component (b) in the direction of an absorption axis F of the incident light faces the refractive index difference and therefore, is reflected from that portion.

Further, the thicknesses t1, t2, t3 . . . of the respective layers A and B as shown in FIGS. 2 and 3 are varied gradually so as to reflect light (b-1), (b-2) . . . of different wavelength from boundary surfaces of respective layers. In other words, by providing a multilayer structure of layers A and B having different thicknesses, light including all kinds of wavelength can be reflected with efficiency. If the combination of the thicknesses of respective layers are set so as to reflect all wavelengths, white light can be reflected.

As described above, when a polarization separation film of a thin-film laminated structure formed by laminating a plurality of thin films is used as the second polarization separator, the polarization separation film of this structure can be formed in a very thin thickness and flexibility can be imparted. Thus, the entire thickness of the electronic watch can be reduced and, moreover, its manufacturing step can be simplified.

Another display device according to the present invention may include: a first polarization separator which transmits linearly polarized light polarized in one direction and which does not transmit other linearly polarized light; a polarization changing element which is placed at the position receiving the linearly polarized light emitted from the first polarization separator, and which is capable of selecting one of a changing state and a non-changing state of the polarization axis of the transmitted polarized light; a second polarization separator which is placed opposite to the above first polarization separator with the polarization changing element in between, and which transmits linearly polarized light in one direction and reflects other linearly polarized light; and a light-reflecting layer which is placed on the opposite side of the above polarization changing element across the second polarization separator to reflect light. The light-reflecting layer has characteristics such that a visually recognized state is changed in response to a viewing angle.

In addition, another electronic watch according to the present invention may include: a first polarization separator which transmits linearly polarized light polarized in one direction and which does not transmit other linearly polarized light; a polarization changing element which is placed at the position receiving the linearly polarized light emitted from the first polarization separator, and which is capable of selecting one of a changing state and a non-changing state of the polarization axis of the transmitted polarized light; a second polarization separator which is placed opposite to the above first polarization separator with the polarization changing element in between, and which transmits linearly polarized light in one direction and reflects other linearly polarized light; and a light-reflecting layer which is placed on the opposite side of the above polarization changing element across the second polarization separator to reflect light. The light-reflecting layer has characteristics such that a visually recognized state is changed in response to a viewing angle.

In this arrangement, the first polarization separator, the polarization changing element and the second polarization separator may have constructions the same as the previously described first polarization separator, the polarization changing element and the second polarization separator.

Features of the display device and the electronic watch constructed as described above according to the present invention are as follows.

(A) The second polarization separator above-described is provided in place of a polarizer provided on the back of a polarization changing element in the conventional display device; and further (B) The light-reflecting layer provided on the back of the second polarization separator is formed by a substance having characteristics such that a visually recognized state is changed in response to a viewing angle.

While a general polarizer has a function of transmitting linearly polarized light facing one direction and of not transmitting other polarized light, the second polarization separator employed in the present invention has a function of transmitting linearly polarized light of one direction and of reflecting other linearly polarized light, and in particular, of totally reflecting the linearly polarized light in the direction perpendicular to a transmitted polarization axis.

Therefore, the second polarization separator constructed as described above is used in place of the normal polarizer and the light, which has been conventionally absorbed or dispersed by the polarizer, can be contributed to a display by reflection. Thus, a background or information such as numeric characters or the like of the display device and the electronic watch can be remarkably brightly displayed.

In particular, when the light-reflecting layer is provided on the rear side of the second polarization separator, if the second polarization separator is formed by a normal polarizer in a conventional manner, reflected light from the light-reflecting layer is absorbed by the polarizer. Therefore, the reflected light of sufficient quantity cannot be provided to a viewer. In contrast, if a polarization separation component of a type for reflecting, not absorbing linearly polarized light component other than linearly polarized light of a predetermined direction is employed for the above second polarization separator of the present invention, the reflected light from the light-reflecting layer is repeatedly reflected between the second polarization separator and the light-reflecting layer until it matches the transmitted polarization axis of the second polarization separator. When the polarization axis finally matches the polarization axis of the second polarization separator, it passes therethrough to reach the viewer. In other words, quantity of reflected light, which has been conventionally wastefully consumed by absorption, can be efficiently provided to the viewer. Consequently, the pattern provided on the light-reflecting layer can be provided to the viewer with sufficient quantity of light.

The reflected light from the light-reflecting layer can be used for displaying information such as numeric characters or the like, or for displaying the background depending on setting of the polarization axes of each of the components of the first polarization separator, the polarization changing element and the second polarization separator. When this reflected light from the light-reflecting layer is used for displaying the background, if the light-reflecting layer is formed by a substance having characteristics such that a visually recognized state is changed in response to a viewing angle, the background can be varied. Thus, various information other than information such as numeric characters can be provided to the viewer. Moreover, the viewer's interest can be strongly attracted.

A substance such as, for example, a sheet material having a Fresnel lens on the surface may be used to form the light-reflecting layer.

In addition, a substance having a rugged geometrical pattern on the surface such as, for example, a sheet material, may be used to form the light-reflecting layer.

In addition, a substance including a hologram sheet may be used to form the light-reflecting layer.

In all the sheet materials described above, if the viewer changes an angle for viewing the sheet material, the appearance of an image reflected on the sheet material is varied. Thus, if this is used as a background in an electronic watch display and so forth, a variety of displays can be realized and the viewer's interest can be strongly attracted.

In particular, when a hologram sheet is used, a mosaic pattern is formed on the surface of the hologram sheet, and hologram characteristics of respective pattern portions of the mosaic pattern can be varied intentionally. This allows respective pattern portions of the mosaic pattern to illuminate in a specific reflection color following specific hologram characteristic. Consequently, the hologram sheet can be illuminated in various reflection colors at respective mosaic patterns. Moreover, if the viewer changes an angle for viewing the hologram sheet, reflection colors of respective mosaic pattern portions are successively changed in accordance with hologram characteristics. Thus, the display form of the electronic watch or the like can be further varied.

In the electronic watch described above, the second polarization separator can be formed by various polarization separation components, as described above. Preferably, however, the second polarization separator is formed using a polarization separation film having a structure disclosed in the international-published international application (International Publication No. WO95/17692 or WO95/27919). Regarding this polarization separation film, it is already described using FIG. 2 and FIG. 3, so that a description will be omitted.

An electronic watch according to the present invention is an electronic watch for counting and displaying time which may include: a first polarization separator which transmits linearly polarized light polarized in one direction and which does not transmit other linearly polarized light; a polarization changing element which is placed at the position receiving the linearly polarized light emitted from the first polarization separator, and which is capable of selecting one of changing state and non-changing state of the polarization axis of the transmitted polarized light; a second polarization separator which is placed on the opposite side of the above first polarizaron separator across the polarization changing element, which transmits linearly polarized light in one direction and which does not transmit other linearly polarized light; and a light-reflecting layer which is placed opposite to the above polarization changing element with the second polarization separator in between. The light-reflecting layer includes a light-accumulative luminescent layer which accumulates light as energy when the outside is bright, and emits the accumulated energy as light when the outside is dark.

If this electronic watch is placed under a bright environment, energy is accumulated in the light-accumulative luminescent layer. If it is placed under a dark environment such as nighttime or the like, light is emitted from the light-accumulative luminescent layer, and a watch display surface is displayed brightly to the outside to be recognized by the viewer. Since the light-accumulative luminescent layer does not require a specific power source and its own thickness is thin, a small-sized electronic watch can be provided at a low cost.

In the above arrangement, the polarization changing element which is the same as that used in the display device described above and in the electronic watch described above can be employed.

In the electronic watch described above, both the first polarization separator and the second polarization separator can be formed by a normal polarizer. The normal polarizer is an optical component having a function of transmitting linearly polarized light facing one direction and of absorbing other polarized light. In other words, this polarizer absorbs linearly polarized light in the direction other than a predetermined direction to prohibit the transmission of the linearly polarized light.

According to this electronic watch, both the first polarization separator and the second polarization separator are formed by the polarizers having the same structure, so that component management becomes easy and a reduction in cost can be achieved.

In addition, in the electronic watch described above, the first polarization separator may be formed by a normal polarizer, and the second polarization separator may be formed by a reflective polarization separation component having the functions of transmitting linearly polarized light facing one direction and of reflecting linearly polarized light in the direction perpendicular thereto. This reflective polarization component reflects linearly polarized light in the direction other than a predetermined direction to prohibit the transmission of the linearly polarized light.

According to this electronic watch, while the normal polarizer absorbs linearly polarized light in the direction other than a predetermined direction, the above reflective polarization separation component has a function of reflecting linearly polarized light in the direction other than a predetermined direction. Thus, a novel and special display form, which cannot realized when using the normal polarizer, can be realized.

The reflective polarization separation component having functions as described above can be formed by employing (1) a polarization separation film having a structure such that many thin films are laminated, as disclosed in an international-published international application (International Publication No. WO95/17692 or WO95/27919), (2) a polarization separation plate having a structure such that a $\lambda/4$ phase plate is provided on both sides or on one side of a cholesteric liquid crystal layer, (3) a polarization separation member (pages 427 to 429 of SID 92 DIGEST) having a structure for separating into reflected polarized light and transmitted polarized light utilizing Brewster angle, or (4) a polarization separation member utilizing a hologram.

The polarization separation film disclosed in the international-published international applications (International Publication No. WO95/1769, WO95/27919) is, for example, one shown in FIG. 2, and this is already described, so that a description thereof will be omitted.

In the electronic watch described above, the light-accumulative luminescent layer can hold electrons excited by absorbed light in its excited state, and may be formed by including a substance which causes light emission by recombination of the held electrons and positive holes. If such a luminescent substance absorbs light, the electrons are first excited in a first excited state and thereafter, captured from the first excited state by a capture center composed of an impurity center and a crystal lattice defect, and held thereby in a predetermined excited state.

Thereafter, the electrons held by the capture center return to the first excited state due to thermal activation, and combine again with positive holes to emit light. As such a luminescent substance, for example, a substance having strontium aluminum oxide ($SrAl_2O_4$) as a base crystal and further including rare earth elements as impupities may be mentioned. According to this electronic watch, the emission time can be continued for a long time when the light-reflecting layer is employed as an illuminant.

An electronic watch according to the present invention is an electronic watch for counting and displaying time which may include: a polarization changing element capable of changing a polarization direction; a first polarization separator having first and second sides and a second polarization separator having third and fourth sides, the first and second polarization separators placed on opposite sides of the polarization changing element; and a third polarization separator having fifth and sixth sides, the third polarization separator placed opposite to the polarization changing element with respect to the second polarization separator.

The first polarization separator is a polarization separator which can emit in a first direction, linearly polarized light incident on the first side to the second side and which can emit, in the first direction, linearly polarized light incident on the second side to the first side.

The second polarization separator is a polarization separator which can transmit linearly polarized light incident on the third side, as linearly polarized light in a second direction; which can reflect to the third side linearly polarized light in a first wavelength region of the light incident on the third side, in a third direction perpendicular to the second direction, as linearly polarized light in the third direction; and which can emit to the fourth side, linearly polarized light in a second wavelength region of the light incident on the third side, as linearly polarized light in a third direction.

The third polarization separator is a polarization separator which can transmit to the sixth side, linearly polarized light incident on the fifth side, as linearly polarized light in a fourth direction; which can reflect to the fifth side linearly polarized light in a third wavelength region of the light incident on the fifth side, as linearly polarized light in a fifth direction perpendicular to the fourth direction; and which can emit to the sixth side, linearly polarized light in a fourth wavelength region of the light incident on the fifth side in a fifth direction.

According to this electronic watch, two display states of the first display state and the second display state can be obtained in accordance with a state of the transmitted polarization axis of the polarization changing element. Since a display color of the first display state and a display color of the second display state are different from each other, a watch display can be effected by these two colors. In addition, both the display states are the display states due to light reflected from a polarization separator, so that remarkably bright display can be obtained as compared with a display element of a conventional system such that polarized light is transmitted by two sheets of polarizers each having a structure for separating polarized light by light absorption.

In the electronic watch described above, the polarization changing element may include a liquid crystal display device.

In addition, the liquid crystal display device may include a TN liquid crystal device, an STN liquid crystal device, or an ECB liquid crystal device. Incidentally, the STN liquid crystal device may include an STN liquid crystal device using color compensating optical anisotropic body.

In the electronic watch described above, the first polarization separator may include a polarizer.

In the electronic watch described above, an angle formed by the second direction and the fourth direction is 45° to 90°.

In the electronic watch described above, an angle formed by the second direction and the fourth direction is 60° to 90°.

In the electronic watch described above, an angle formed by the second direction and the fourth direction is 75° to 90°.

In the electronic watch described above, a light-diffusing plate may further be provided. This allows a watch display state to be changed into a non-mirror surface state.

In the electronic watch described above, a light-absorber may be further provided.

In the electronic watch described above, a light source may be further provided.

In the electronic watch described above, the second polarization separator may be a laminated product in which a plurality of layers are laminated by being adhered to each other. A refractive index of the plurality of layers may be equal in a sixth direction between adjacent layers, and may be different in a seventh direction perpendicular to the sixth direction.

In the electronic watch described above, the third polarization separator may be a laminated product in which a plurality of layers are laminated by being adhered to each other. A refractive index of the plurality of layers may be equal in an eighth direction between adjacent layers, and may be different in a ninth direction perpendicular to the eighth direction.

As a polarization separator described above, for example, a polarization separator 21 of a laminate structure as shown schematically in FIG. 24 may employed. A functional principle of the polarization separator 21 will be described below.

The polarization separator shown herein has a structure of a plurality of layers formed by alternately laminating two different types of layers A and B. The refractive index $n_{AX}$ in the X direction of layers A and the refractive index $n_{AY}$ in the Y direction are different from each other, i.e., $n_{AX} \neq n_{AY}$. In addition, the refractive index $n_{BX}$ in the X direction of layers B and the refractive index $n_{BY}$ in the Y direction are equal to each other, i.e., $n_{BX}=n_{BY}$.

Therefore, if light is incident on the top surface 21a of the polarization separator 21 from the direction perpendicular to the surface, of the light, linearly polarized light in the Y direction is transmitted by the polarization separator 21 to be emitted from the bottom surface 21b as linearly polarized light in the Y direction. Conversely, if light is incident on the bottom surface 21b of the polarization separator 21 from the direction perpendicular to the surface, of the light, linearly polarized light in the Y direction is transmitted by the polarization separator 21 to be emitted from the top surface 21a as linearly polarized light in the Y direction. Here, the Y direction to be transmitted is called a transmission axis.

On the other hand, if the thickness of a layer A in the Z direction is taken as $t_A$, the thickness of a layer B in the Z direction is taken as $t_B$, and the wavelength of the incident light is taken as $\lambda$, by setting optical characteristics to satisfy the following expression, $$t_A \cdot n_{AX} + t_B \cdot n_{BX} = \lambda/2 \qquad (1)$$

when light of wavelength $\lambda$ is incident on the top surface 21a of the polarization separator 21 from the direction perpendicular to the surface, of the light, linearly polarized light in the X direction is reflected by the polarization separator 21 as linearly polarized light in the X direction. In addition, the linearly polarized light which is the light of wavelength $\lambda$ and incident on the bottom surface 21b of the polarization separator 21 in the direction perpendicular to the surface is reflected by the polarization separator 21 as linearly polarized light in the X direction. Here, the X direction to be reflected is called a reflection axis.

By variously changing the thickness of the layers A in the Z direction and the thickness of the layers B in the Z direction to allow the above expression (1) to be held over a certain wavelength range of visible light, only light in a certain wavelength region ($\Delta\lambda$) can be reflected and light in other wavelength region ($-\Delta\lambda$) can be transmitted. That is, a linearly polarized light component in the Y direction is transmitted as linearly polarized light in the Y direction. Light which is a linearly polarized light component in the X direction and in a certain wavelength ($\Delta\lambda$) is reflected as linearly polarized light in the X direction. Light which is a linearly polarized light component in the X direction and in other wavelength region ($-\Delta\lambda$) is transmitted as linearly polarized light in the X direction.

DETAILED DESCRIPTION OF PREFERRED EMBODIMENTS

First Embodiment

Figure 4:
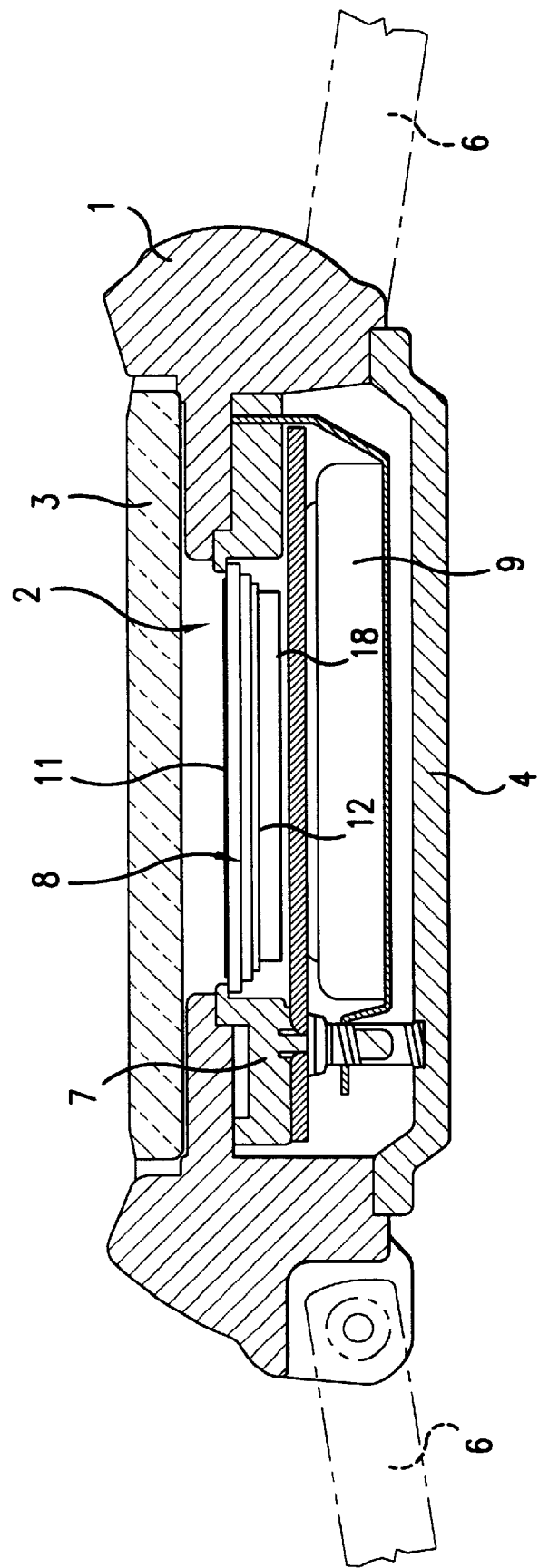
FIG. 4 is a cross-sectional view showing the cross-sectional configuration of an embodiment of an electronic wristwatch which is an embodiment of an electronic watch according to the present invention.

FIG. 4 shows the cross-sectional configuration of an embodiment of an electronic watch using a display device according to the present invention as a display section. This electronic watch is a wristwatch which is composed of, for example, a plastic casing 1, a movement 2 stored in the casing 1, a glass plate 3 which is fixed to the casing 1 and located on the movement 2, and a rear cover 4 for fixing the movement 2. Numeral 6 denotes a wristband.

Figure 6:
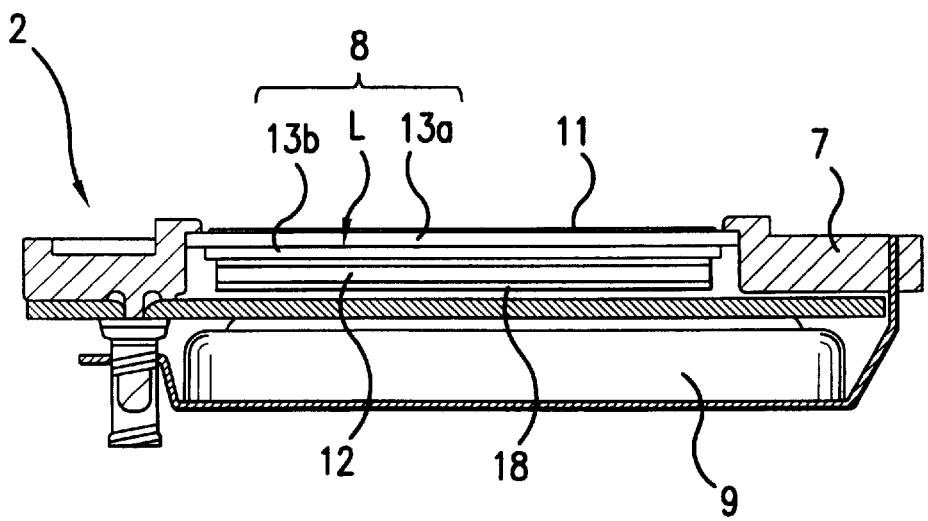
FIG. 6 is a cross-sectional view showing the cross-sectional configuration of the movement of FIG. 5.

The movement 2 includes, as shown in FIG. 6, a panel frame 7, a liquid crystal panel 8 as a polarization changing element which is supported by the panel frame 7, a polarizer 11 as a first polarization separator which is adhered on the outer surface (the upper surface of the drawing) of the liquid crystal panel 8, a polarization separation film 12 as a second polarization separator which is placed on the opposite side of the polarizer 11 across the liquid crystal panel 8, a backlight 18 disposed on the bottom surface side of the polarization separation film 12, and a battery 9.

Figure 1:
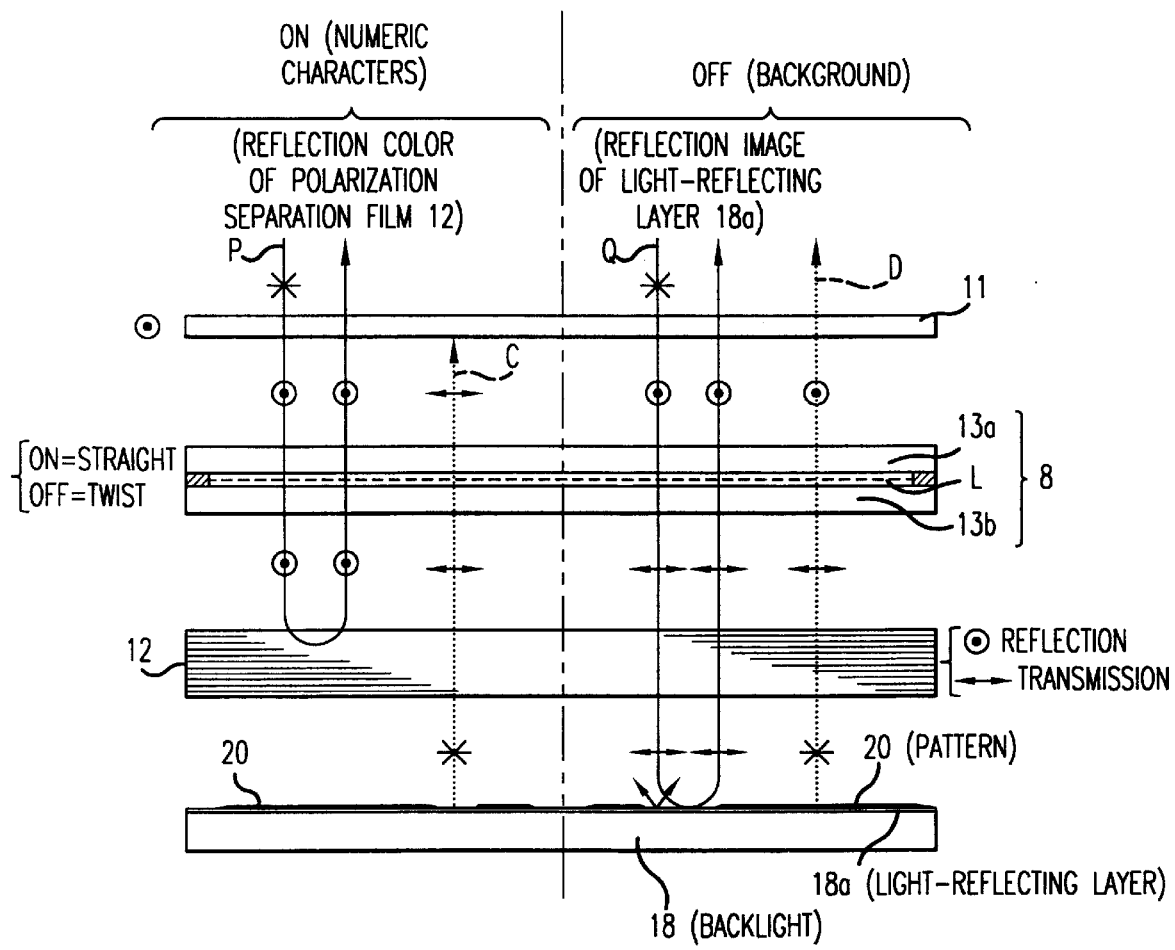
FIG. 1 is a view showing schematically an embodiment of a display device according to the present invention.
Figure 2:
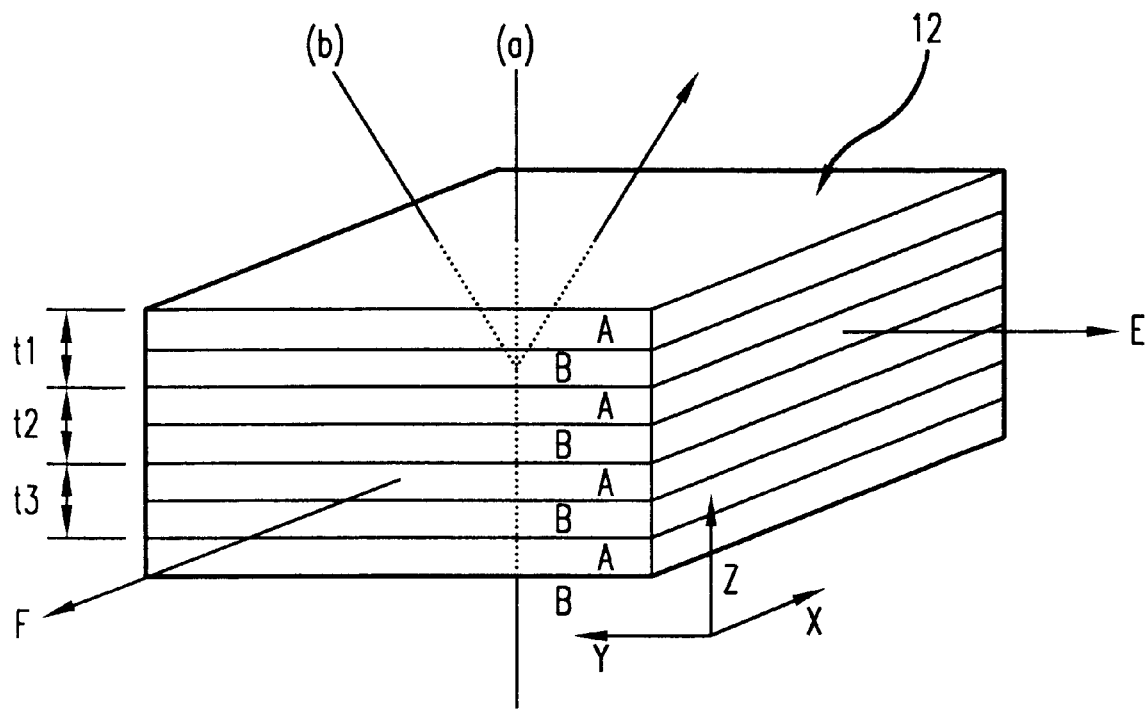
FIG. 2 is a perspective view showing schematically an internal structure of a polarization separation film which is used as a main part of the structure shown in FIG. 1.
Figure 3:
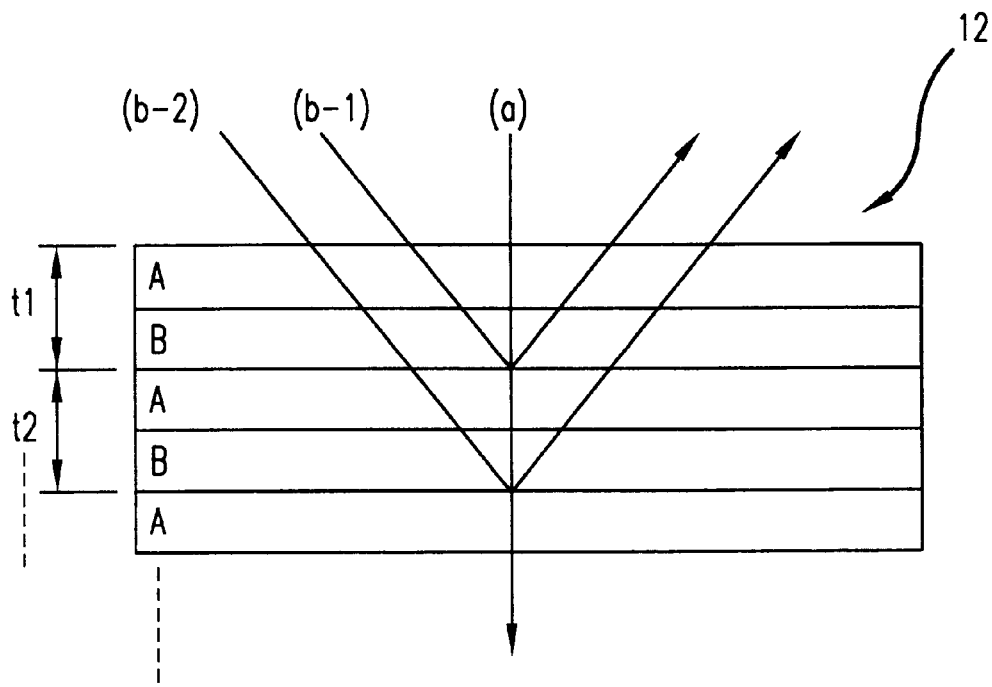
FIG. 3 is a view showing schematically the operation of the polarization separation film shown in FIG. 2.

The polarizer 11 is formed of a normal polarization plate, and acts so as to transmit linearly polarized light facing one direction and so as not to transmit other polarized light by absorbing and scattering and so forth. According to this embodiment, in FIG. 1, the position of the polarizer 11 is set so that the polarization axis of the polarizer 11 faces the direction perpendicular to the plane of the drawing. In addition, the polarization separation film 12 is composed of, as shown in FIG. 2, a polarization separation film having a structure such that multiple thin layers are laminated. As described earlier, the polarization separation film 12 acts so as to transmit linearly polarized light facing one direction and to reflect other linearly polarized light rather than to absorb, and in particular, acts so as to entirely reflect linearly polarized light in the direction perpendicular to the polarization axis.

In the polarization separation film 12 of this embodiment, the thicknesses t1, t2, t3 . . . (see FIG. 2) of respective layers are set so that the light of all wavelengths in the visible light region can be reflected. Incidentally, the plane of the polarization separation film 12 opposing the liquid crystal panel 8 may be a smooth plane for mirror-reflecting light, or may be a light-scattering layer, i.e., a light-diffusing layer. In the case of the smooth plane, a reflected image from the polarization separation film 12 is a mirror reflection image. In the case of the light-diffusing layer, a reflected image from the polarization separation film 12 has a single (normally, white) background color with no pattern. If a color layer is provided on the surface of the polarization separation film 12, the image can be suitably colored.

Figure 8:
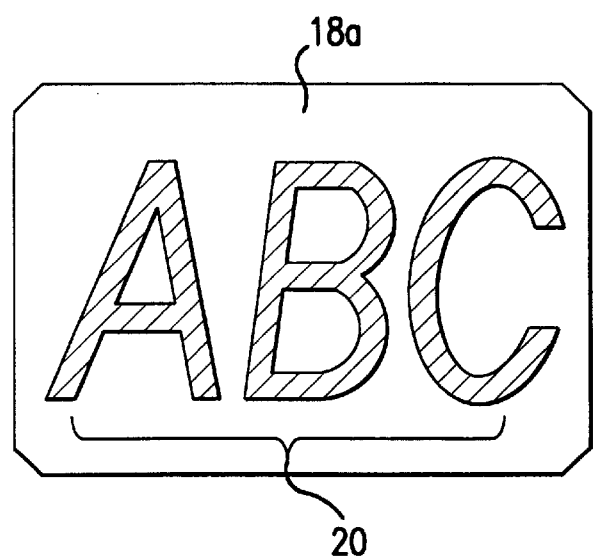
FIG. 8 is a plan view showing an example of a light-reflecting layer.

The backlight 18 of FIG. 6 is composed of, for example, an EL element, which is a plane light emitting element. The surface of the backlight 18 is, as shown in FIG. 1, a light-reflecting layer 18a for irregularly reflecting light. In the case of this embodiment, the light-reflecting layer 18a is formed by, as shown in FIG. 8, providing a pattern 20 on a white background by printing. Although a suitable mark such as a logo and a trademark, a suitable character and other various patterns may be considered as the pattern 20, the characters "ABC" shall be drawn in this embodiment.

Figure 5:
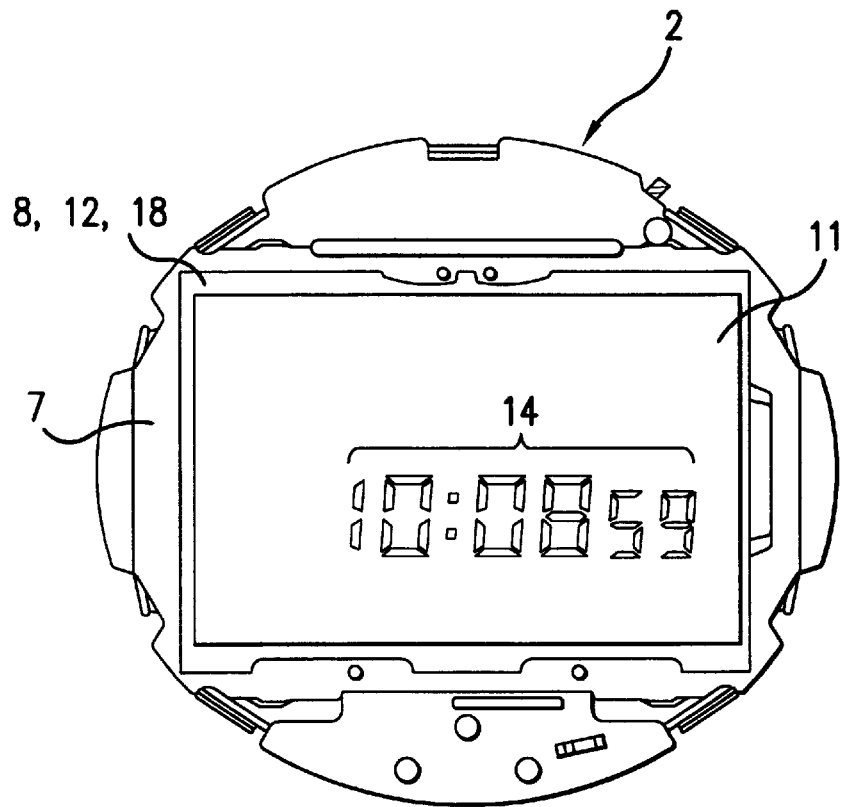
FIG. 5 is a plan view showing a movement used in the electronic wristwatch of FIG. 4.

In FIG. 6, the liquid crystal panel 8 has a pair of transparent glass substrates 13a and 13b opposing each other. Liquid crystal, such as TN liquid crystal L, is sealed in a gap, a so-called cell gap, formed between the glass substrates. A plurality of transparent electrodes 14 for displaying information such as numeric characters, characters or the like are formed on the glass substrates 13a and 13b, as shown in FIG. 5. In this embodiment, a transparent electrode divided into seven segments is employed as a transparent electrode for displaying a one-digit numeric character.

A predetermined voltage can be applied between a pair of segment transparent electrodes 14 opposing each other which are formed on the pair of glass substrates 13a and 13b, respectively. According to whether the voltage is applied (ON) or the voltage is not applied (OFF), the alignment of the liquid crystal L can be set to one of the two states. The liquid crystal of this embodiment is set so that the polarization axis of the linearly polarized light passing through the liquid crystal is not changed when it is in the ON state, while the polarization axis of the polarized light passing through the liquid crystal is twisted only 90° when it is in the OFF state.

The operation of an electronic wristwatch constructed as described above will be described further below.

This wristwatch has two kinds of light source forms: a light source form utilizing emission of the backlight 18, and a light source form utilizing external natural light without utilizing the emission of the backlight 18. In addition, when the background is to be displayed on the display surface of the wristwatch, the liquid crystal panel 8 of that region is set to the OFF state. When information such as numeric characters or the like is to be displayed on the display surface of the wristwatch, the liquid crystal panel 8 of that region is set to the ON state. Hereinafter, these various cases will be described individually.

(When external natural light is used)

When display is effected using the external natural light, especially when the background is displayed, the liquid crystal panel 8 is set to the OFF state in FIG. 1. Thereupon, as shown by the arrow Q of the drawing, of the external light, i.e., natural light, linearly polarized light in the direction perpendicular to the plane of the drawing is transmitted by the polarizer 11, and the polarization direction is twisted 90° by the liquid crystal panel 8 in the OFF state to become linearly polarized light in the direction parallel to the plane of the drawing.

Figure 7:
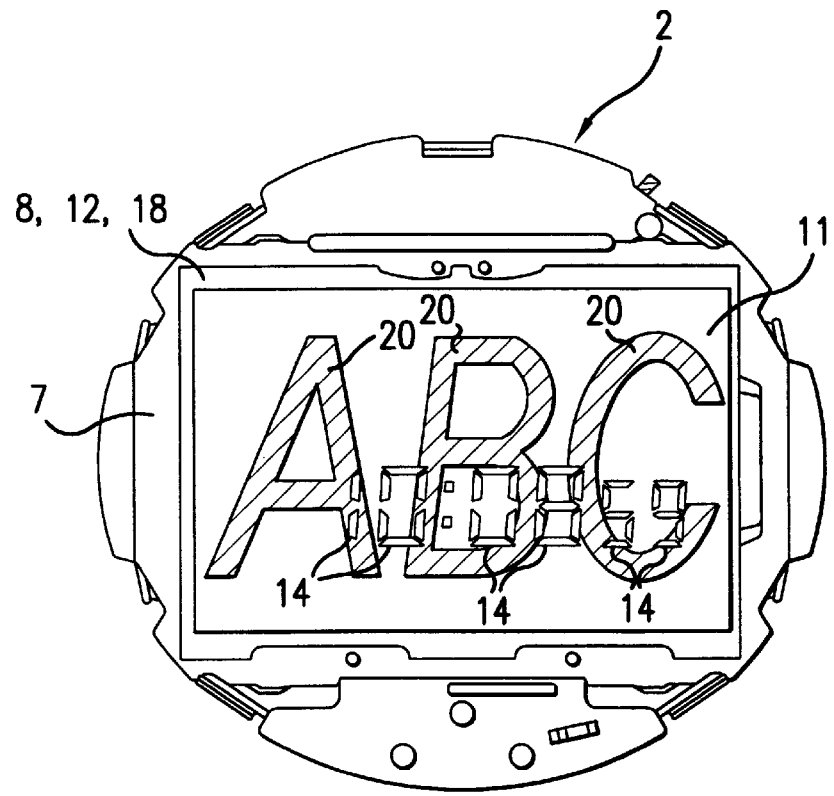
FIG. 7 is a plan view showing an example of display form of the electronic wristwatch of FIG. 4.

This linearly polarized light is transmitted by the polarization separation film 12 to reach the light-reflecting layer 18a and is reflected therefrom. The reflected light is transmitted by the polarization separation film 12, the liquid crystal panel 8 and the polarizer 11 to be recognized by a viewer. Since the light-reflecting layer 18a has the pattern 20, the background on which the pattern 20 is drawn is recognized from the outside, as shown in FIG. 7. The background color around the pattern 20 should be relatively dark color, such as gray, in order to distinguish the information such as characters or the like. Incidentally, in order to obtain such a relatively dark background color, the color of the ground of the light-reflecting layer 18a is colored relatively dark in advance.

In FIG. 1, the light irregularly reflected from the light-scattering layer 18a includes a component for shifting the polarization axis thereof, and the optical component is reflected from the polarization separation film 12 to return to the light-scattering layer 18a again, and repeats the reflection until it matches the polarization axis of the polarization separation film 12, and then comes out upward. In contrast, according to the conventional structure using a normal polarizer in place of the polarization separation film 12, the optical component by which the polarization axis is shifted is absorbed by the polarizer and does not come out upward. In other words, according to this embodiment using the polarization separation film 12, the light reflected from the light-scattering layer 18a can be efficiently guided to the outside, and hence the pattern 20 can be displayed in a remarkably bright and easy-to-see state.

When information such as numeric characters or the like is displayed using the external natural light, the liquid crystal panel 8 is set to the ON state. Thereupon, as shown by the arrow P, linearly polarized light in the direction perpendicular to the plane of the drawing is taken out of the external light by the polarizer 11, and the linearly polarized light is transmitted by the liquid crystal panel 8. Since the liquid crystal panel 8 is in the ON state at this time, the polarization direction of the linearly polarized light is maintained in the direction perpendicular to the plane of the drawing without being twisted, and therefore, the linearly polarized light is reflected between each of the layer surfaces in the polarization separation film 12 in response to the wavelength, and the reflected light is displayed to the outside after being sequentially transmitted by the liquid crystal panel 8 and the polarizer 11. This allows a portion of a segment in the transparent electrodes 14 in FIG. 7 to be displayed by the reflection color of the polarization separation film 12.

According to the foregoing description, when display is effected using the external natural light, information such as numeric characters or the like displayed by the segment electrodes 14 can be recognized on a background of gray or the like on which the pattern 20 is drawn. In the conventional display form, only information such as numeric characters or the like is displayed on a single background color such as white, so that the display form is dull. In this embodiment, however, the pattern 20 can be drawn on the background and varied, so that various information can be provided to the viewer and the viewer's interest can be strongly attracted.

(When the backlight 18 is used)

When display is effected using emitted light of the backlight 18, especially when the background is displayed, the backlight 18 is lit and further, the liquid crystal panel 8 is set to the OFF state. Thereupon, as shown by the arrow D, the linearly polarized light in the direction parallel to the plane of the drawing is taken out of the emitted light i.e., natural light of the backlight 18 by the polarization separation film 12. Further, the polarization direction of the linearly polarized light is twisted 90° by the liquid crystal display device 8 in the OFF state to be converted into linearly polarized light in the direction perpendicular to the plane of the drawing. This linearly polarized light is transmitted by the polarizer 11 to be emitted to the outside, and is recognized as the-background. In other words, the background having the pattern 20 displayed on the emission color of the backlight 18 is recognized.

When information such as numeric characters or the like is displayed using the emitted light of the backlight 18, the backlight 18 is lit and, the liquid crystal panel 8 is set to the ON state. Thereupon, as shown by the arrow C, linearly polarized light in the direction parallel to the plane of the drawing is taken out of the emitted light of the backlight 18 by the polarization separation film 12, and the linearly polarized light is transmitted by the liquid crystal panel 8 in the ON state. Since the polarization axis of the linearly polarized light is in the direction parallel to the plane of the drawing, it is absorbed or scattered by the polarizer 11 and prevented from being emitted to the outside, and hence this portion is recognized as black from the outside.

According to the foregoing description, when effecting a display using the emitted light from the backlight 18 in the case where the external natural light is not incident because of darkness, information such as numeric characters or the like is displayed in a dark color such as black on the background of the emitted light of the backlight 18 on which the pattern 20 is drawn.

The light-reflecting layer 18a of FIG. 1 may include a fluorescent material which emits fluorescence when light falls upon the light-reflecting layer. This allows the pattern 20 printed on the light-reflecting layer 18a to be clearly recognized in such a manner as to raise from the background color emitting fluorescence, thereby making a strong impression on the viewer.

Second Embodiment

Figure 9:
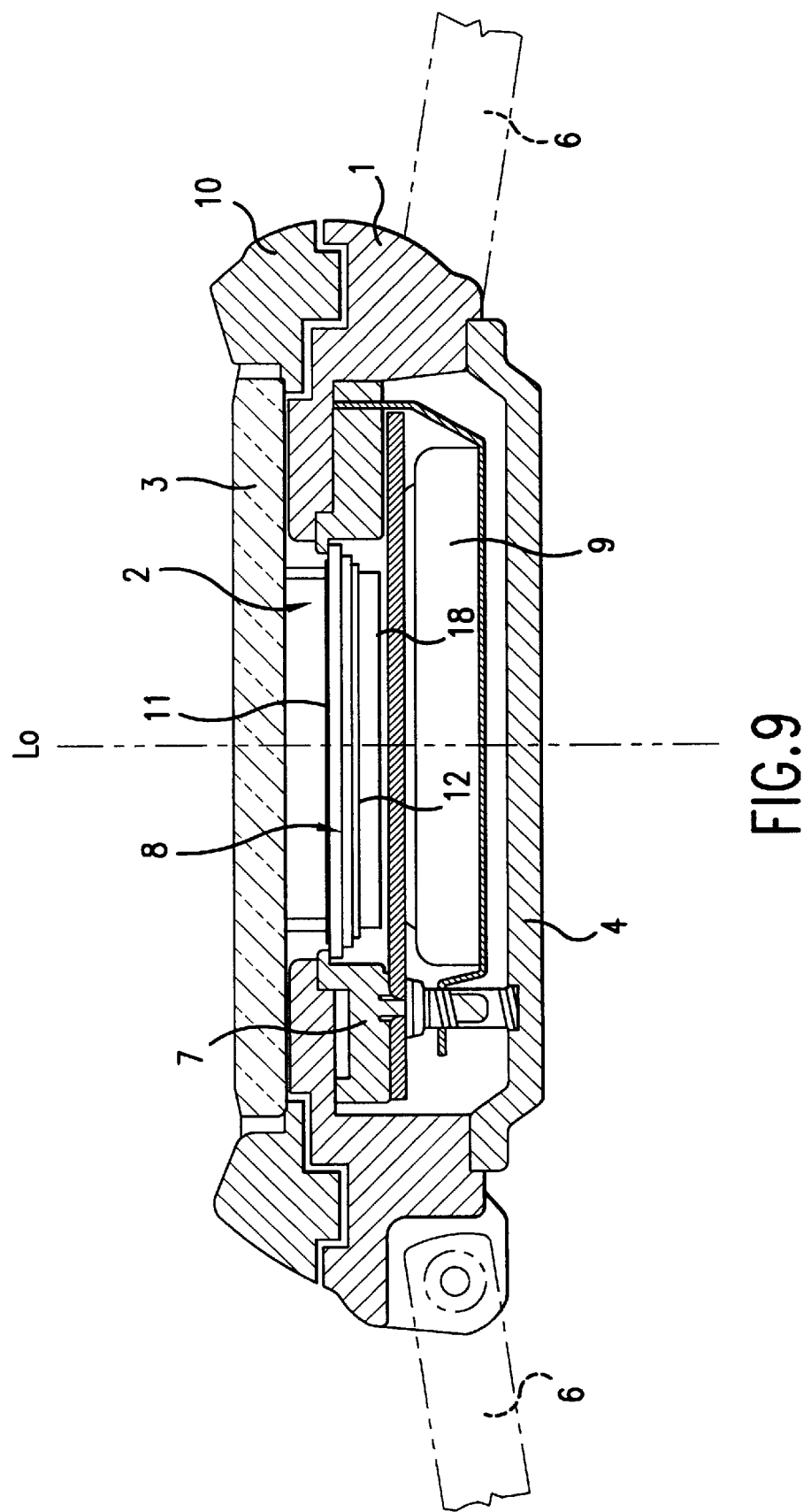
FIG. 9 is a cross-sectional view showing the cross-sectional configuration of another embodiment of the display device and the electronic watch according to the present invention.

FIG. 9 shows another embodiment of the display device and the electronic watch according to the present invention. This embodiment differs from the previous embodiment shown in FIG. 4 in that a rotary ring 10 rotatable in relation to the casing 1 is provided on the casing 1, and the glass plate 3 and the polarizer 11 are integrally connected to the rotary ring 10. According to this embodiment, the viewer lifts up the rotary ring 10 with the fingers and rotates it about the center axis L0 of the wristwatch, whereby the polarizer 11 can be rotated about the center axis L0. If the polarizer 11 is rotated in this way, since the polarization axis of the polarizer 11 is changed from the direction perpendicular to the plane of the drawing in FIG. 1, the transmission characteristics of the linearly polarized light due to the polarizer 11 are changed, so that display contents to be displayed to the outside are varied and the viewer's interest can be strongly attracted.

Figure 10:
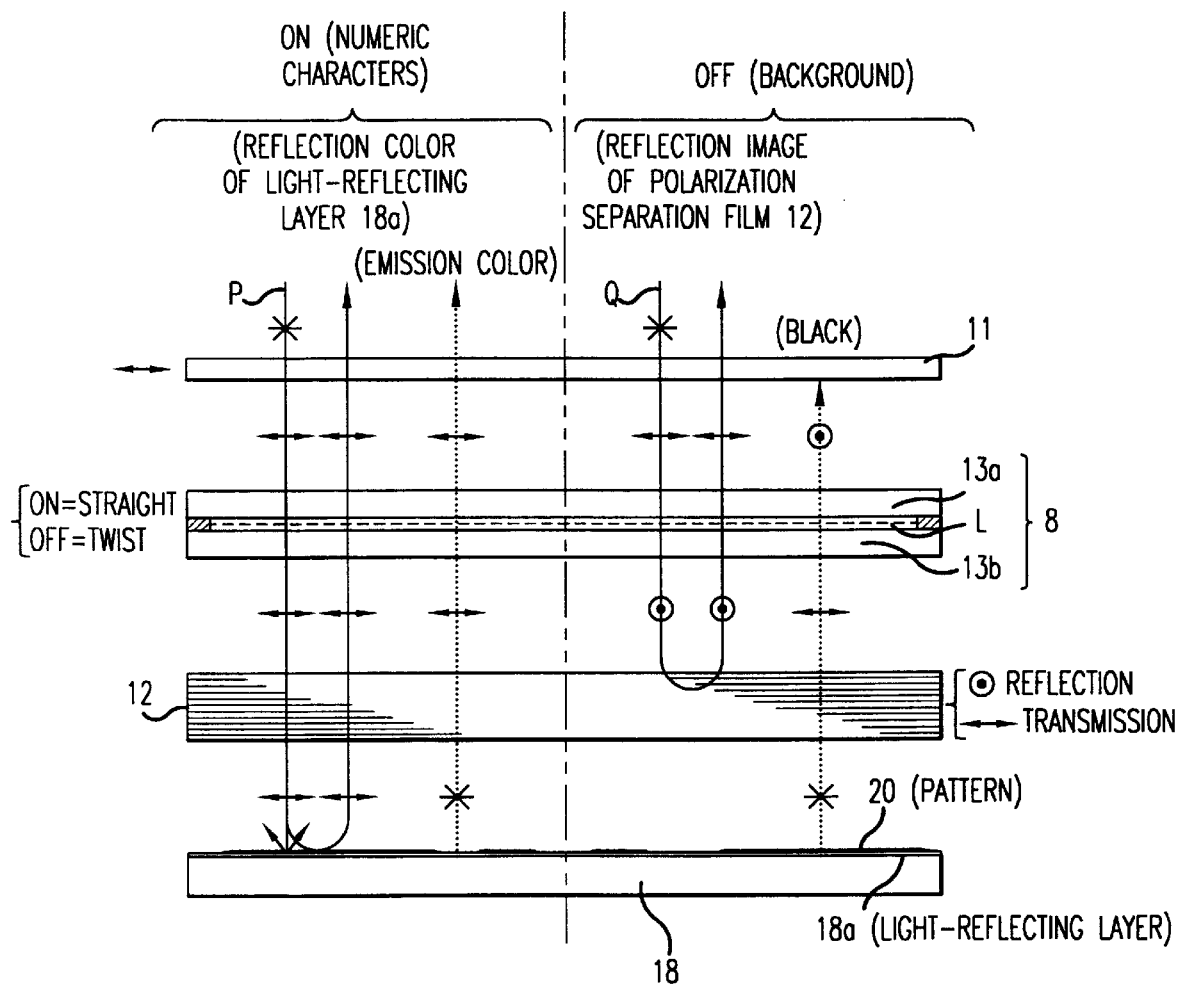
FIG. 10 is a view showing schematically an example of various display forms effected by using the electronic wristwatch of FIG. 9.

For example, if the polarizer 11 is rotated 90° from the state of FIG. 1, the transmitted polarization axis of the polarizer 11 can be changed in the direction parallel to the plane of the drawing, as shown in FIG. 10. Thus, when display is effected using the external natural light, the background is displayed by the reflection image of the polarization separation film 12, as shown by the arrow Q, while information such as numeric characters or the like is displayed by the reflection color from the light-reflecting layer 18a. In other words, in this case, the background is not displayed using the light-reflecting layer 18a, so that the pattern 20 is not displayed on the background, and information such as numeric characters or the like is displayed by the segment electrodes 14 on the background of a single color with no pattern.

In other words, according to this embodiment, by rotating the rotary ring 10, the display form of the electronic watch can be freely changed between the form for displaying simultaneously both the pattern 20 and information such as numeric characters or the like, as shown in FIG. 7, and the form for displaying only information such as numeric characters or the like by turning off the pattern 20, as shown in FIG. 5.

In the case of FIG. 7, the background including the pattern 20 is displayed by the reflection image (the arrow Q of FIG. 1) of the light-reflecting layer 18a, and information such as numeric characters or the like due to the segment electrodes 14 is displayed by the reflection color (the arrow P of FIG. 1) of the polarization separation film 12. On the other hand, in the case of FIG. 5, the background is displayed by the reflection image (the arrow Q of FIG. 10) of the polarization separation film 12, and information such as numeric characters or the like is displayed by the reflected color (the arrow P of FIG. 10) of the light-reflecting layer 18a. In other words, when the display form is changed between the state of FIG. 5 and the state of FIG. 7 by rotating the rotary ring 10, the pattern 20 can be turned on and turned off, and at the same time, the display colors of the background and information such as numeric characters or the like can be changed. Therefore, a very exciting display to the viewer can be provided.

Third Embodiment

Figure 11:
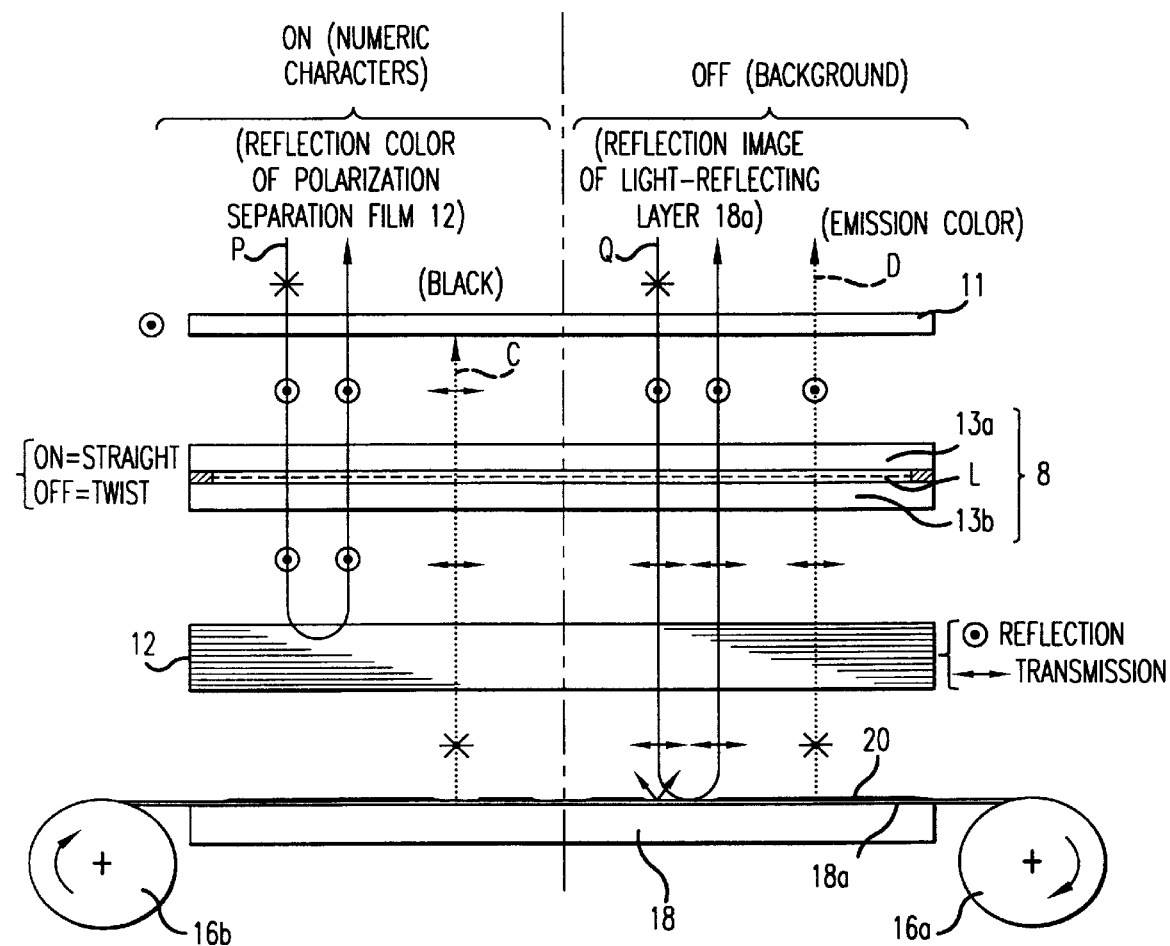
FIG. 11 is a view showing schematically a further embodiment of the display device according to the present invention.

FIG. 11 shows a further embodiment of the display device and the electronic watch according to the present invention. This embodiment differs from the previous embodiment shown in FIG. 1 in that a pair of take-up reels 16a and 16b are provided on both sides of the backlight 18, and the light-reflecting layer 18a in continuous form is looped over the reels. In the longitudinal direction of the light-reflecting layer 18a, instead of the pattern 20 of "ABC" shown in FIG. 8, another pattern consisting of a suitable logo, a mark, a character and so forth is printed. Therefore, if the light-reflecting layer 18a is taken up by one of the reels 16a and 16b, and is taken out by the other reel simultaneously, various patterns can be carried onto a portion corresponding to the backlight 18. Thereby, various background patterns are provided to the viewer. Incidentally, the rotational drive of the reels 16a and 16b can be effected manually by the viewer from the outside, or can be effected automatically using a drive source provided in the wristwatch.

Other Embodiments

While the invention has been described in its preferred embodiments, the invention is not limited to those embodiments and can be varied within the scope of the invention.

For example, although the display device of the present invention is applied to the display section of an electronic wristwatch, the display device of the present invention can be applied to all types of electronic equipment. In addition, although a case where the present invention is applied to the wristwatch is shown in the above-described embodiments, it is a matter of course that the present invention can be applied to an electronic watch having another structure, such as a stopwatch and so forth.

In addition, although a liquid crystal panel using TN liquid crystal is employed as the polarization changing element capable of selecting one of a changing state and a non-changing state of the polarization axis of the transmitted polarized light in the above-described embodiments, a liquid crystal panel using STN liquid crystal or ECB liquid crystal can be employed in place of this.

In addition, a multilayer structure, in which a plurality of thin films are laminated as shown in FIG. 2, is employed as the second polarization separator for effecting the action of transmitting linearly polarized light of one direction and of reflecting other linearly polarized light. However, in place of this, (1) a polarization separation plate having a structure such that a λ/4 phase plate is provided on both sides or on one side of a cholesteric liquid crystal layer, (2) a polarization separation member (pages 427 to 429 of SID 92 DIGEST) having a structure for separating into reflected polarized light and transmitted polarized light utilizing Brewster angle, or (3) a polarization separation member utilizing a hologram may be employed.

Fourth Embodiment

Figure 12:
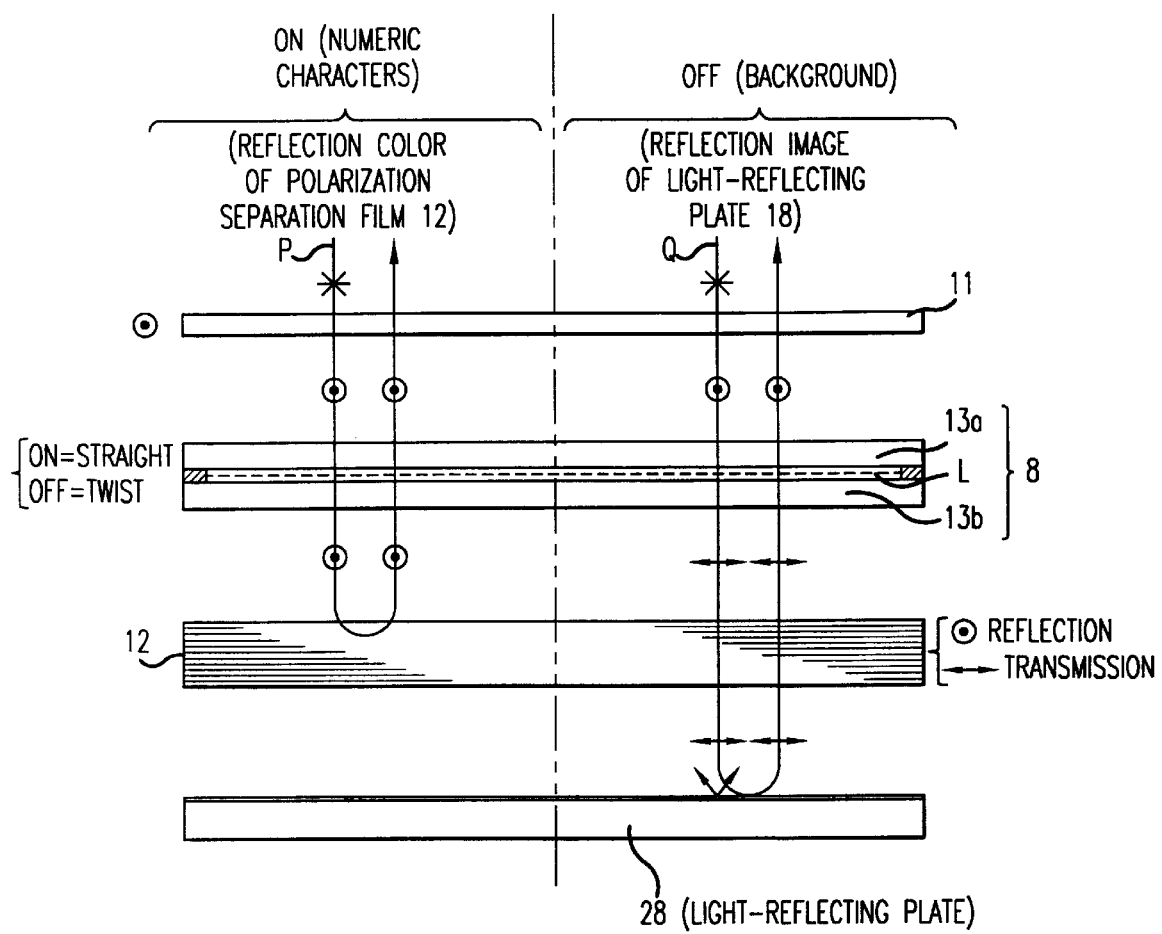
FIG. 12 is a view showing schematically a still further embodiment of the display device according to the present invention.

FIG. 12 shows the cross-sectional configuration of another embodiment of the display device according to the present invention. This display device is used as the display section of the electronic watch shown in FIG. 4. Since the structure of the electronic watch has already been described using FIG. 2, FIG. 3, FIG. 5 and FIG. 6, a description thereof will be omitted. In addition, since the components in FIG. 12 indicated by the same numerals as those of the components in FIG. 1 are the components having the same functions, a description thereof will be omitted.

In this embodiment, as compared with the embodiment of FIG. 1, an alteration is made by adding the light-reflecting plate 28 in place of backlight 18. The light-reflecting plate 28 is formed by a hologram sheet. As is generally known, if an angle for viewing the hologram sheet is changed, the color of the reflected light from the hologram sheet is changed corresponding thereto.

Figure 13:
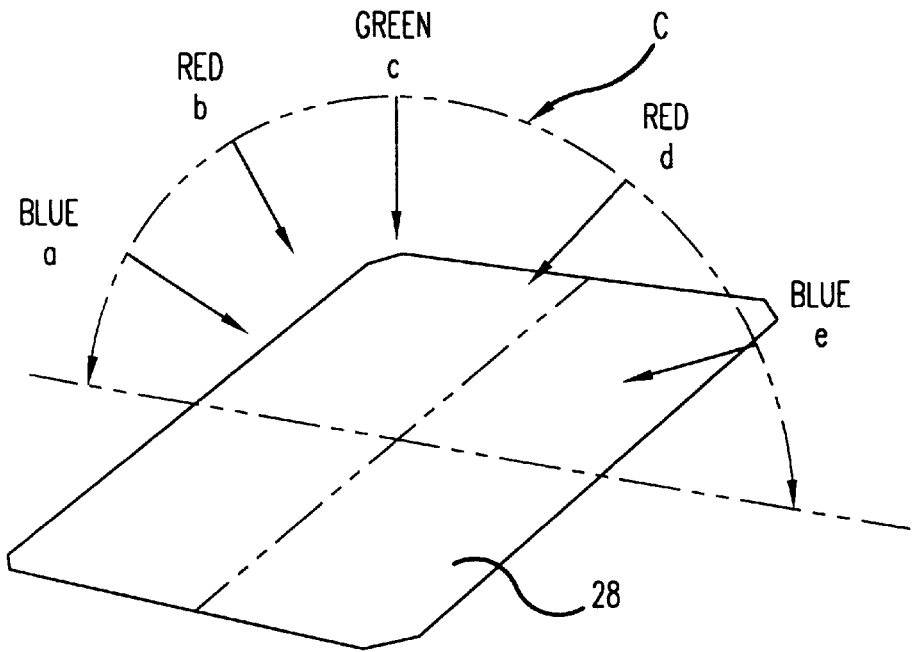
FIG. 13 is a perspective view showing an embodiment of a light-reflecting layer and viewing angle properties thereof.

For example, as shown by the arrow C in FIG. 13, if an angle for viewing the hologram sheet 28 is gradually changed in a minor axis direction in a manner of a-b-c-d-e, the whole of the hologram sheet 28 changes in color continuously for the viewer in a manner of, for example, blue-red-green-red-blue. In addition, as shown by the arrow D in FIG. 14, if the angle for viewing the hologram sheet 28 is gradually changed in a major axis direction in a manner of f-g-h, the whole of the hologram sheet 28 changes in color continuously for the viewer in a manner of, for example, white-green-white.

The operation of the display device constructed as described above and the electronic wristwatch using the display device will be described further below.

When the background is displayed, the liquid crystal panel 8 is set to the OFF state in FIG. 12. Thereupon, as shown by the arrow Q in the drawing, of the external light, or the natural light, linearly polarized light in the direction perpendicular to the plane of the drawing is transmitted by the polarizer 11, and the polarization direction is twisted 90° by the liquid crystal panel 8 in the OFF state to become linearly polarized light in the direction parallel to the plane of the drawing.

Figure 14:
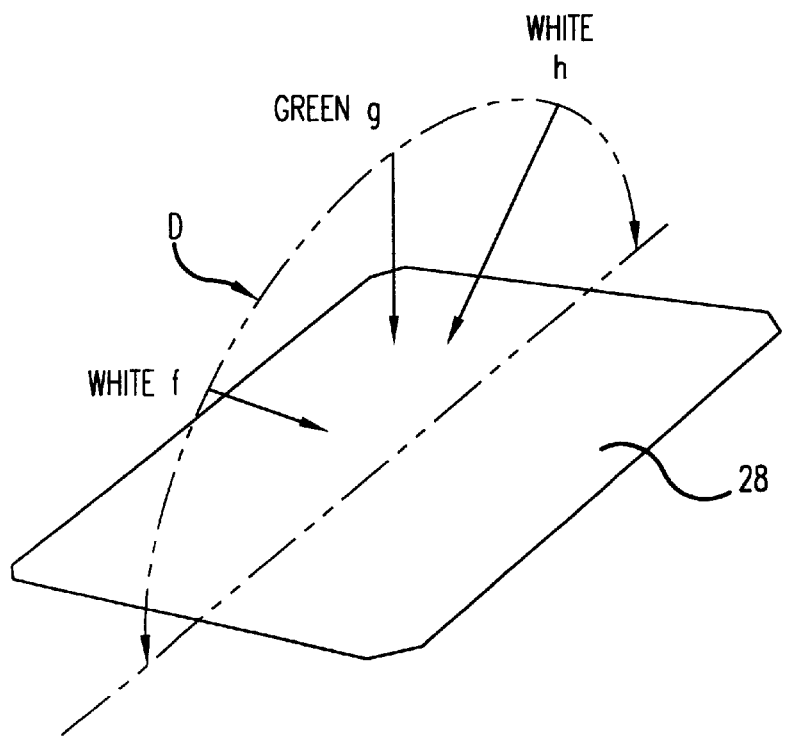
FIG. 14 is a perspective view showing schematically the viewing angle properties as viewed from another direction of the light-reflecting layer shown in FIG. 13.

The linearly polarized light is transmitted by the polarization separation film 12 to reach the light-reflecting plate 28 and is reflected therefrom. The reflected light is recognized by the viewer after being transmitted by the polarization separation film 12, the liquid crystal panel 8 and the polarizer 11. Since the light-reflecting plate 28 is composed of a hologram sheet, if the viewer changes an angle for viewing the watch display from the outside, the reflection color of the light-reflecting plate 28 is varied in response to the angle, as shown in FIG. 13 and FIG. 14. Therefore, the viewer will recognize the background of which the color is varied in response to the angle.

In FIG. 12, the light irregularly reflected from the light-reflecting plate 28 includes a component for shifting the polarization axis. The light component is reflected from the polarization separation film 12 to return to the light-reflecting plate 28 again, is repeatedly reflected until it matches the polarization axis of the polarization separation film 12, and then comes out upward. In contrast, according to the conventional construction using a normal polarizer in place of the polarization separation film 12, the light component by which the polarization axis is shifted is absorbed by the polarizer and does not come out upward. In other words, according to this embodiment using the polarization separation film 12, the light reflected from the light-reflecting plate 28 can be efficiently guided to the outside, and hence the reflection image due to hologram properties of the light-reflecting plate 28 can be displayed in a remarkably bright and easy-to-see state.

In FIG. 12, when information such as numeric characters or the like are displayed, the liquid crystal panel 8 is set to the ON state. Thereupon, as shown by the arrow P, linearly polarized light in the direction perpendicular to the plane of the drawing is taken out of the external light by the polarizer 1, and the linearly polarized light is transmitted by the liquid crystal panel 8. Since the liquid crystal panel 8 is in the ON state at this time, the polarization direction of the linearly polarized light is maintained in the direction perpendicular to the plane of the drawing without being twisted. Therefore, the linearly polarized light is reflected between each of the layer surfaces in the polarization separation film 12 in response to the wavelength, and the reflected light is displayed to the outside after being sequentially transmitted by the liquid crystal panel 8 and the polarizer 11. This allows a portion of a segment in the ON state of the transparent electrodes 14 in FIG. 5 to be displayed by the reflection color of the polarization separation film 12.

According to the foregoing description, when a watch display is effected using the external natural light in this embodiment, information such as numeric characters or the like displayed by the segment electrodes 14 can be recognized on the background which is changed in color in response to the viewing angle due to the hologram properties. In the conventional display form, only information such as numeric characters or the like is displayed on a single background color such as white, so that the display form is dull. According to this embodiment, however, the color of the background is changed in response to the viewing angle, so that the viewer can enjoy a variety of display forms.

Fifth Embodiment

Figure 15:
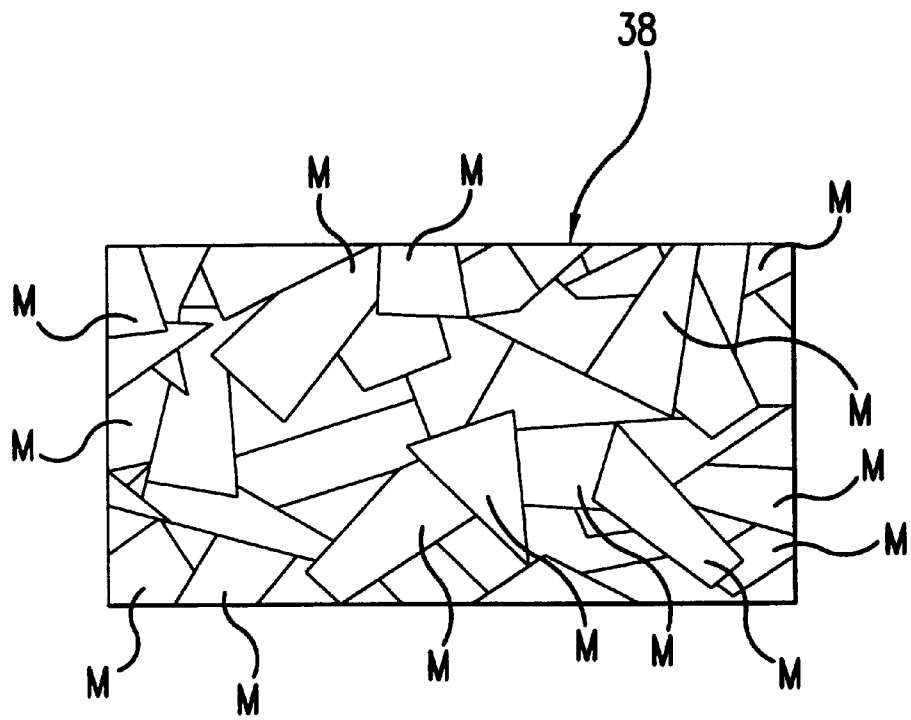
FIG. 15 is a plan view showing another embodiment of the light-reflecting layer.

FIG. 15 shows another embodiment of the light-reflecting plate which can be used in the display device and in the electronic watch of the present invention. A light-reflecting plate 38 is constituted by using the hologram sheet similar to the previous light-reflecting plate 28 shown in FIG. 13 and FIG. 14. The difference between the two light-reflecting plates is that the entire surface of the light-reflecting plate 28 of FIG. 13 has a single hologram property. Therefore, when the color of the light-reflecting plate 28 is changed in response to the viewing angle, the whole of the light-reflecting plate 28 is uniformly changed in color.

In contrast, regarding the light-reflecting plate 38 of FIG. 15, mosaic patterns are formed on the surface thereof, and an individual mosaic pattern portion M has its own hologram property. Therefore, each mosaic pattern portion M emits reflected light of a color in accordance with its hologram property, so that the whole of the light-reflecting plate 38 emits light in various colors in the individual mosaic pattern portion M. Then, the emission display is used as the background of the watch display. Therefore, the viewer can enjoy the variety of display forms as compared with a case of viewing a conventional background of a single color.

In addition, if the viewer gradually changes the angle for viewing the watch display, i.e. the angle for viewing the light-reflecting plate 38, the individual mosaic pattern portion M changes the reflection color in accordance with its own hologram property. If this is observed over the light-reflecting plate 38, the light-reflecting plate is brilliantly continuously changed in color in the individual mosaic pattern portion M, for example, green-red,-blue-gray. Therefore, the viewer can enjoy a further variety of display forms.

Sixth Embodiment

Figure 16:
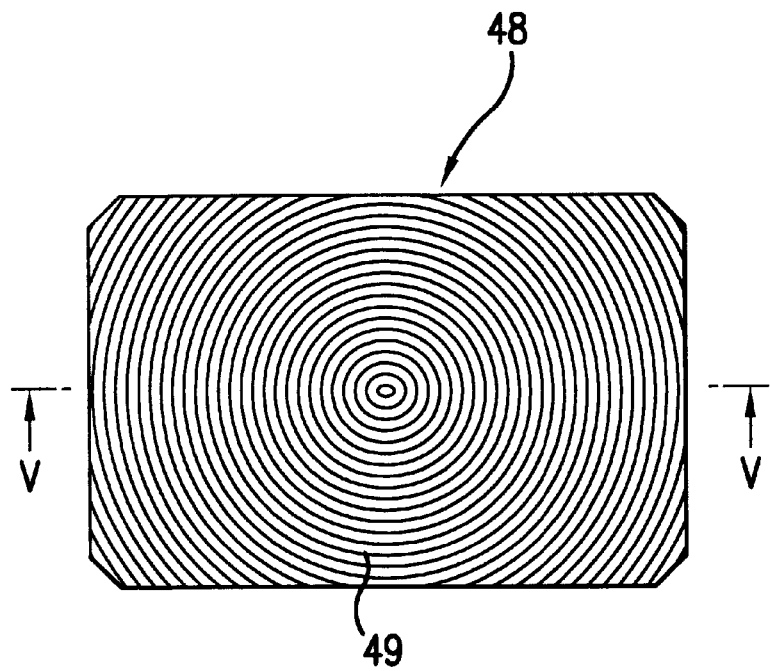
FIG. 16 is a plan view showing a further embodiment of the light-reflecting layer.
Figure 17:
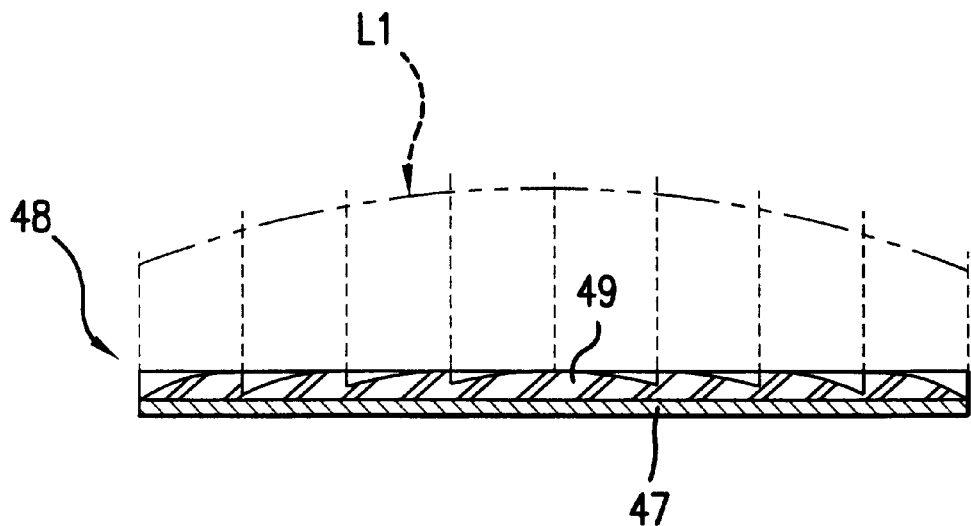
FIG. 17 is a cross-sectional view showing the cross-sectional configuration taken along the line V—V of FIG. 16.

FIG. 16 shows a further embodiment of a light-reflecting plate which can be used in the display device and in the electronic watch of the present invention. A light-reflecting plate 48 shown herein has a Fresnel lens 49 made of resin which is formed in a concentric pattern on the surface thereof. The Fresnel lens 49 is, as generally known and as shown in FIG. 17, formed by, for example, dividing a lens surface L1 of a convex lens for each concentric pattern, and by arranging them in the form of a flat surface. A light-reflecting layer 47 such as Al (aluminum) is adhered to the back of the Fresnel lens 49.

If the Fresnel lens 49 is formed to be colorless and transparent, the light incident on the light-reflecting plate 48 is incident on the light-reflecting layer 47 through the Fresnel lens 49, reflected therefrom and then guided to the outside through the Fresnel lens 49 again. Therefore, the viewer viewing the watch display of FIG. 5 recognizes a mirror reflection image optically processed by the Fresnel lens 49 as the background of the information display such as numeric characters or the like using the segment electrodes 14. This background is changed to various states by changing the viewing angle of the watch display, so that a variety of displays can be provided to the viewer. Incidentally, if the Fresnel lens 49 is formed by suitably colored resin, the background can be configured by a colored reflection image, so that a further variety of background can be viewed.

Seventh Embodiment

Figure 18:
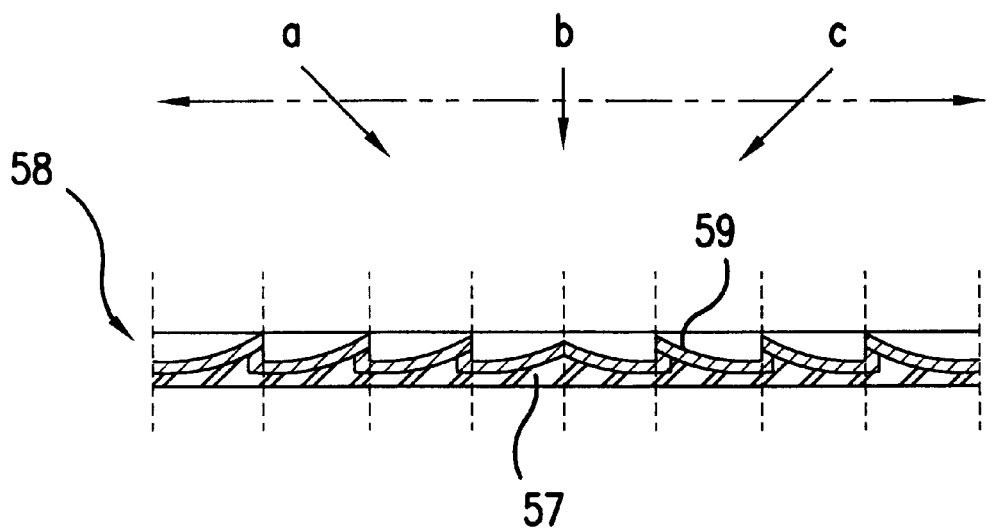
FIG. 18 is a cross-sectional view showing a still further embodiment of the light-reflecting layer.

FIG. 18 shows a still further embodiment of the light-reflecting plate which can be used in the display device and in the electronic watch of the present invention. A light-reflecting plate 58 shown herein can be formed into a plane state of the concentric pattern shown in FIG. 16, for example. The light-reflecting plate 58 is composed of an Al reflecting layer 57 rugged for every concentric pattern, and a color resin layer 59 covered thereon.

According to this embodiment, if the viewing angle is continuously changed in the direction parallel to the plane of the drawing in a manner of a-b-c, or continuously changed in the direction perpendicular to the plane of the drawing by the action of the rugged shape provided on the Al reflecting layer 57, the reflected image recognized from the outside is changed in various states. For example, the changes can be recognized such that the concentric pattern of FIG. 16 can be partially clearly viewed and not, and that a strongly shining portion moves left and right, up and down, or in a circumferential direction. Thus, if the background is displayed using the light-reflecting plate 58, the appearance of the background can be changed variously in response to the change in the viewing angle direction of the viewer and hence, the watch display and so forth can be varied.

Other Embodiments

While the invention above have been described in its preferred embodiments, the invention is not limited to those embodiments and can be changed variously within the scope of the invention as described in claims.

For example, the display device discussed above is applicable as a display section for all types of electronic equipment except the electronic wristwatch. In addition, although a liquid crystal panel using the TN liquid crystal is employed as the polarization changing element capable of selecting one of a changing state and a non-changing state of the polarization axis of transmitted polarized light in the above-described embodiments, a liquid crystal using an STN liquid crystal or an ECB liquid crystal can be employed in place of this.

In addition, a multilayer structure in which a plurality of thin films are laminated as shown in FIG. 2 is employed as the second polarization separator for effecting the action of transmitting linearly polarized light of one direction and of reflecting other linearly polarized light. However, in place of this, (1) a polarization separation plate having a structure such that $\lambda/4$ phase plates are provided on both sides or one side of cholesteric liquid crystal layer, (2) a polarization separation member (pages 427 to 429 of SID 92 DIGEST) having a structure for separating into reflected polarized light and transmitted polarized light utilizing Brewster angle, or (3) a polarization separation member utilizing a hologram may be employed.

Eighth Embodiment

Figure 19:
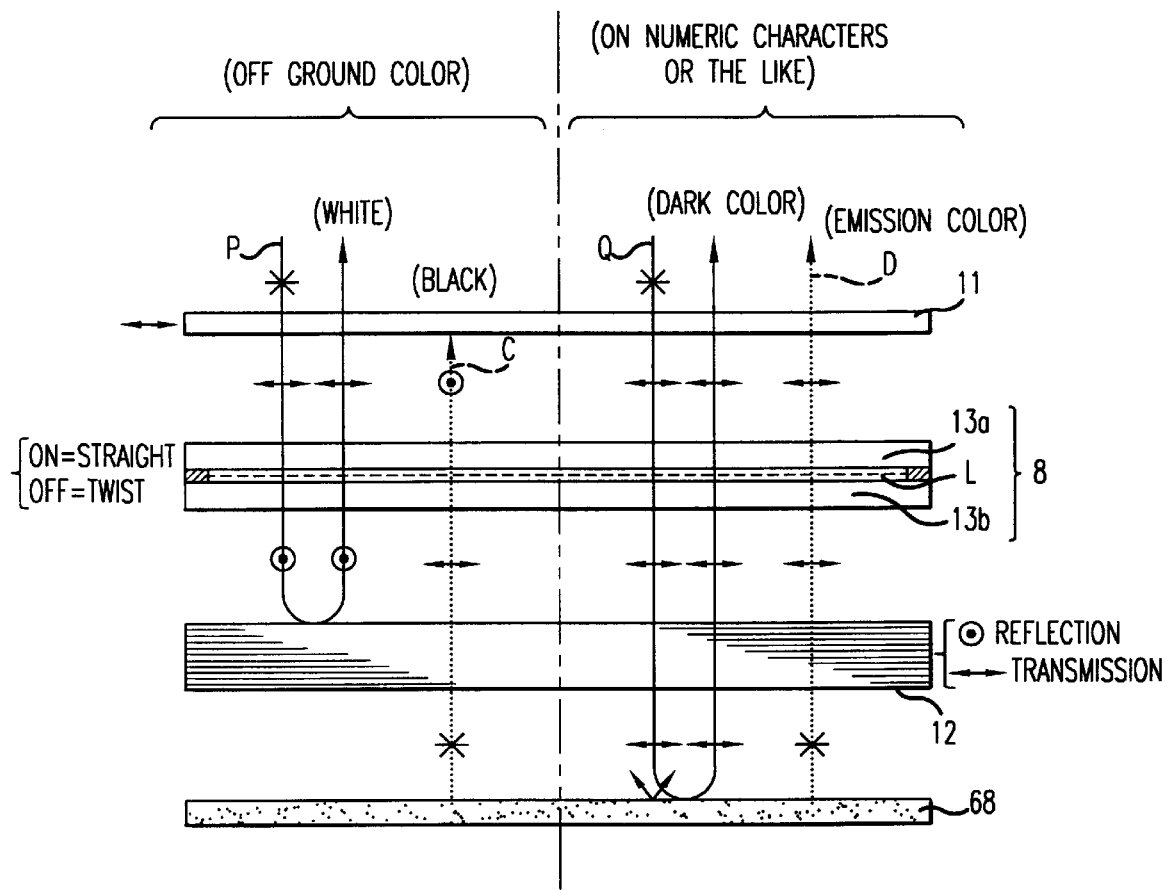
FIG. 19 is a view showing schematically a further embodiment of the display device used in the electronic watch according to the present invention.

FIG. 19 schematically shows a main part of another embodiment of the electronic watch. In the embodiment shown herein, a reflective polarization separation film 12 is used as the second polarization separator which is provided on the opposite side of the first polarizer 11 across the liquid crystal panel 8. Other points are the same as those of the components of FIG. 1, and the same members are indicated by the same references.

The polarization separation film 12, which is the same as the polarization separation film 12 used in the display device of FIG. 1 can be used in this embodiment, and more specifically, a film of a multilayer structure shown in FIG. 2 can be used. This polarization separation film 12 differs from a normal polarizer. The normal polarizer absorbs linearly polarized light except the linearly polarized light capable of being transmitted, while the reflective polarization separation film 12 reflects the linearly polarized light. Since the polarization separation film 12 has such optical characteristics, the following display states can be realized in the embodiment of FIG. 19.

(When the light-reflecting plate 68 is used as a light reflector)

When display is effected using external natural light under a daytime bright environment, especially when the background color is displayed, the liquid crystal panel 8 is first set to the OFF state in FIG. 19. As shown by the arrow P in the drawing, of the external light, i.e., natural light, linearly polarized light in the direction parallel to the plane of the drawing is transmitted by the first polarizer 11, and the polarization direction is twisted 90° by the liquid crystal panel 8 in the OFF state to become linearly polarized light in the direction perpendicular to the plane of the drawing. The linearly polarized light is reflected between layer surfaces in the polarization separation film 12 in response to the wavelength, and the reflected light is displayed to the outside after being sequentially transmitted by the liquid crystal panel 8 and thy first polarizer 11. This allows the background color to be displayed within the display surface of the wristwatch. This background color is usually "white".

An influence of light absorption by the polarizer is eliminated in the embodiment shown in FIG. 19, so that luminance of the white background can be increased and hence, the display surface of the watch can be displayed more brightly.

When information such as numeric characters or the like is displayed using the external natural light, the liquid crystal panel is set to the ON state. As shown by the arrow Q, linearly polarized light in the direction parallel to the plane of the drawing is taken out of the external light by the first polarizer 11, and the linearly polarized light is transmitted by the liquid crystal panel 8. Since the liquid crystal panel 8 is in the ON state at this time, the polarization direction of the linearly polarized light is maintained in the direction parallel to the plane of the drawing without being twisted. Hence, the linearly polarized light is transmitted by the polarization separation film 12 and further reflected irregularly from the surface of the light reflecting plate 68. The light returning to the side of the polarizer 11 is reduced by this irregular reflection. Hence this portion is displayed from the outside as a dark color such as gray in relation to the background, and therefore, recognized as information such as numeric characters or the like by the viewer. Of course, a highcontrast "black" can be positively produced by providing a semi-transmissive light absorber between the polarization separation film 12 and the light-reflecting plate 68 to positively absorb light.

According to the foregoing description, when the external natural light is used, information such as numeric characters or the like can be displayed in a dark color on the white background color by utilizing reflection characteristics of the light reflector 68. At that time, energy is accumulated in the light-accumulative luminescent layer of the light reflector 68.

(When the light-reflecting plate 68 is used as an illuminant)

When display is effected using the emitted light of the light reflector 68 under a nighttime dark environment, especially when displaying the background color, the liquid crystal panel 8 is set to the OFF state. As shown by the arrow C in FIG. 19, linearly polarized light in the direction parallel to the plane of the drawing is taken out of the emitted light, i.e., natural light of the light reflector 68 by the polarization separation film 12, and the polarization direction of the linearly polarized light is twisted 90° by the liquid crystal panel 8 in the OFF state to be converted into linearly polarized light in the direction perpendicular to the plane of the drawing. Since the linearly polarized light is absorbed or diffused by the first polarizer 11 to be prevented from being emitted to the outside, it is recognized as the "black" background color from the outside.

When information such as numeric characters or the like is displayed using the emitted light of the light-reflecting plate 68, the liquid crystal panel 8 is set to the ON state. As shown by the arrow D in FIG. 19, linearly polarized light in the direction parallel to the plane of the drawing is taken out of the emitted light of the light-reflecting plate 68 by the polarization separation film 12. The linearly polarized light is transmitted by the liquid crystal panel 8 in the ON state, and is further transmitted by the first polarizer 11 to be displayed to the outside. Since the color of information such as numeric characters or the like displayed at this time is determined by the color of the emitted light of the light-reflecting plate 68, if the color of the emitted light is set to a color such as yellow green, red, or orange-color, which is easily identified with respect to the "black", the information such as numeric characters can be viewed in a very easy-to-identify state. Incidentally, the color of the emitted light is set by, for example, providing a color filter.

As described above, according to this embodiment, if the external environment becomes dark, the light-reflecting plate 68 acts as the illuminant so that information such as numeric characters or the like is displayed in a color, such as yellow green and the like, on the black background color. This display is continued until the energy accumulated in the light-accumulative luminescent layer of the light-reflecting plate 68 is used up.

As described above, according to the wristwatch of this embodiment, even if the watch is placed under a dark environment such as nighttime, the display surface of the watch can be brightly displayed based on the emitted light from the light-accumulative luminescent layer of the light-reflecting plate 68. Further, since the light-accumulative luminescent layer does not require a specific power source and has a thin thickness, the wristwatch can be formed in small size at a low cost.

In addition, according to the wristwatch of this embodiment, the black information display is effected on a white ground when the external natural light is employed (the arrow P and the arrow Q in FIG. 19). On the other hand, the information display by the color such as yellow and green of the emitted light is effected on a black ground when emission characteristics of the light-reflecting plate 68 are employed (the arrow C and the arrow D of FIG. 19).

When compared to either the case where the external natural light is used or the case where the emission function of the light-reflecting plate 68 is employed, the display form is such that only the black information display is effected on the white ground, the display form of this embodiment in FIG. 19 is very novel such that the display color of information such as numeric characters or the like is reversed between yellow, green or other specific color and black standard color. Thus, the viewer's interest can be strongly attracted.

While the electronic watch has been described above in its preferred embodiments, the present invention is not limited to those embodiments and can be varied within the scope of the invention.

For example, although a case where the present invention is applied to the wristwatch is shown in the above-described embodiments, the present invention can be applied to other electronic watches, such as a stopwatch and so forth. In addition, although a liquid crystal panel using the TN liquid crystal is employed as the polarization changing element capable of selecting one of a changing state and a non-changing state of the polarization axis of the transmitted polarized light in the above-described embodiments, a liquid crystal panel using the STN liquid crystal or the ECB liquid crystal can be employed in place of this.

In addition, although a multilayer structure in which a plurality of thin films are laminated as shown in FIG. 2 is employed as the second polarization separator in the embodiment of FIG. 19, (1) a polarization separation plate having a structure such that a $\lambda/4$ phase plate is provided on both sides or one side of cholesteric liquid crystal layer, (2) a polarization separation member (pages 427 to 429 of SID 92 DIGEST) having a structure for separating into reflected polarized light and transmitted polarized light utilizing Brewster angle, or (3) a polarization separation member utilizing hologram may be employed in place of this.

Ninth Embodiment

The electronic watch to be described below is characterized in that a liquid crystal display device having a structure such that a plurality of, for example two, polarization separators are arranged on one side of a polarization changing element such as a liquid crystal panel or the like. Before describing the embodiment of the electronic watch, the structure and the operation of such a liquid crystal display device will be described.

Figure 20:
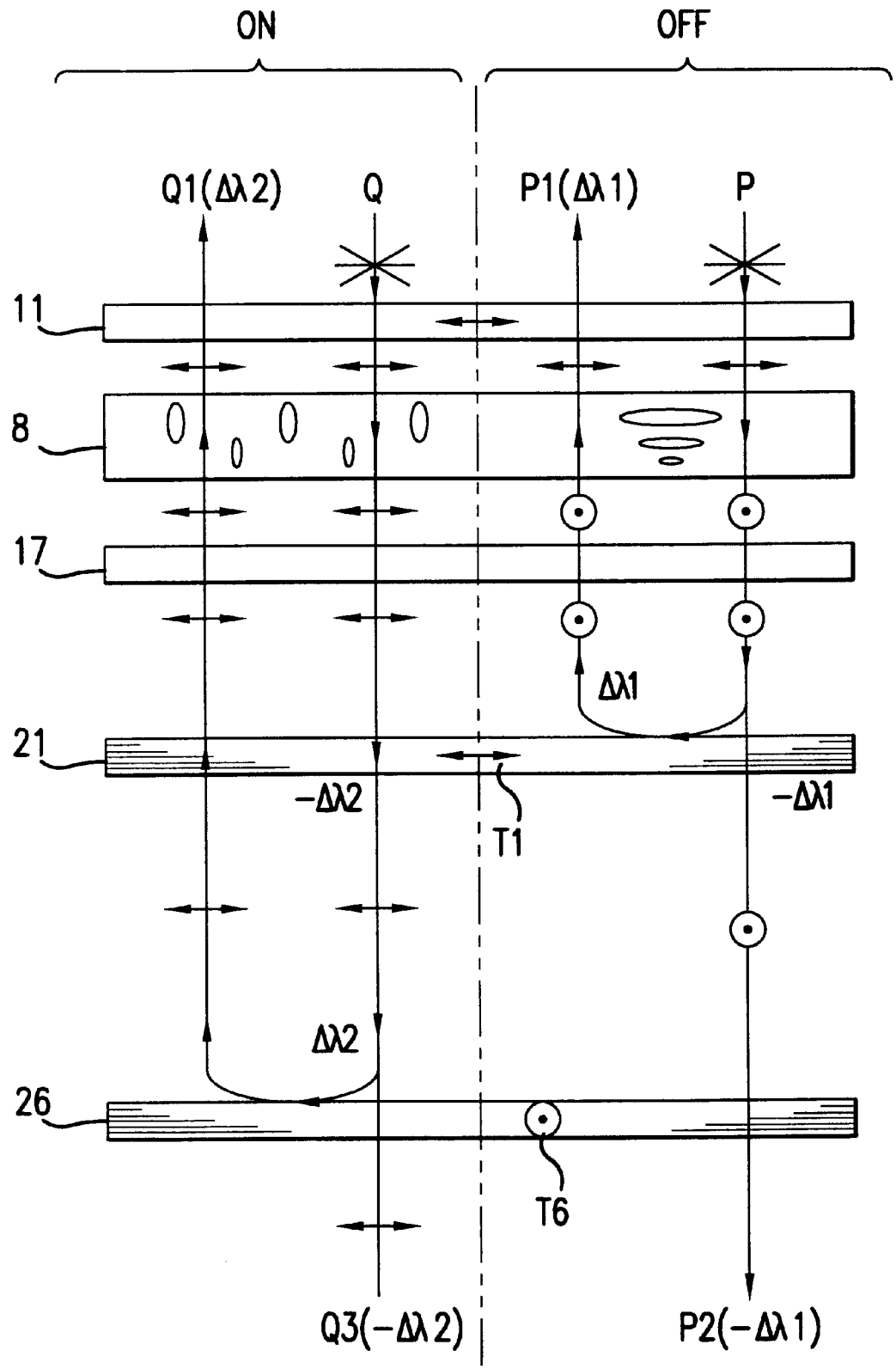
FIG. 20 is a view for explaining a principle of an example of a liquid crystal display device, which is a major component used in the electronic watch according to the present invention.

FIG. 20 schematically shows a liquid crystal display device having a structure such that two polarization separators are arranged on one side of the polarization changing element. The liquid crystal display device shown in this drawing only shows an example of the structure, and the liquid crystal display device is not limited to the structure. In this liquid crystal display device, the TN liquid crystal 8 is used as the polarization changing element. The polarizer 11 is provided on the upper side of the TN liquid crystal 8. On the lower side of the TN liquid crystal 8, the light-scattering layer 17, a polarization separator 21, and a polarization separator 26 are provided in this order.

The polarization separator 21 reflects light which is the light in the direction of the reflection axis and in a certain wavelength region ($\Delta\lambda_1$), and transmits light which is the light in the direction of the reflection axis and in other wavelength region ($-\Delta\lambda_1$). In addition, the polarization separator 26 reflects light which is the light in the direction of the reflection axis and in a certain wavelength region ($\Delta\lambda_2$) different from $\Delta\lambda_1$, and transmits light which is the light in the direction of the reflection axis and in other wavelength region ($-\Delta\lambda_2$). An angle formed by the transmission axis $T_1$ of the polarization separator 21 and the transmission axis $T_6$ of the polarization separator 26 is 90°.

In FIG. 20, when the left side of the liquid crystal display device is taken as an ON-voltage application section and the right side of the same is taken as an OFF-voltage application section, on the OFF-voltage application section, light P is converted by the polarizer 11 into linearly polarized light in the direction parallel to the plane of the drawing. Afterwards, the polarization direction is twisted 90° by the TN liquid crystal to become linearly polarized light in the direction perpendicular to the plane of the drawing, light in the wavelength region ($\Delta\lambda_1$) is reflected and light in the wavelength region ($-\Delta\lambda_1$) is transmitted by the polarizer 21. The reflected light in the wavelength region ($\Delta\lambda_1$) becomes linearly polarized light in the direction perpendicular to the plane of the drawing, and the polarization direction is twisted 90° by the TN liquid crystal 8 to become linearly polarized light in the direction parallel to the plans of the drawing. Light in the wavelength region ($\Delta\lambda_1$) is thus emitted from the polarizer 11 as linearly polarized light in the direction parallel to the plane of the drawing. That is, a color of the wavelength region ($\Delta\lambda_1$) can be viewed.

On the other hand, the transmitted light in the wavelength region ($-\Delta\lambda_1$) becomes linearly polarized light in the direction perpendicular to the plane of the drawing to be transmitted by the polarization separator 26. That is, a color of the wavelength region ($-\Delta\lambda_2$) can be viewed. In this way, when the OFF-voltage is applied, the incident light is not absorbed by the polarization separator 21 but reflected therefrom as viewed from the side of the incident light, so that color display of a bright wavelength region ($\Delta\lambda_1$) can be obtained. Incidentally, since the light-scattering layer 17 is provided between the polarization separator 21 and the TN liquid crystal 8, the reflected light from the polarization separator 21 is changed from the form of a mirror surface to the form of paper. In addition, as viewed from the side opposite to the side of the incident light, display of the wavelength region ($-\Delta\lambda_1$) of the incident light can be obtained by the polarization separator 21 and the polarization separator 26.

On the ON-voltage application section of the left side of the liquid crystal display device shown in FIG. 20, the light Q is converted by the polarizer 11 into linearly polarized light in the direction parallel to the plane of the drawing, is transmitted by the TN liquid crystal 8 without changing the polarization direction and is then converted by the polarization separator 21 into linearly polarized light in the direction parallel to the plane of the drawing. The linearly polarized light emitted from the polarization separator 21 is incident on the polarization separator 26. Of the incident linearly polarized light, light in the wavelength region ($\Delta\lambda_2$) is reflected from the polarization separator 26 and light in the wavelength region ($-\Delta\lambda_2$) is transmitted by the polarization separator 26.

The light in the wavelength region ($\Delta\lambda_2$) reflected from the polarization separator 26 is transmitted by the TN liquid crystal 8 as the linearly polarized light in the direction parallel to the plane of the drawing without changing the polarization direction, and is emitted from the polarizer 11 as linearly polarized light in the direction parallel to the plane of the drawing. That is, a color of the wavelength region ($\Delta\lambda_2$) can be viewed. On the other hand, at the back of the polarization separator 26, a color of the wavelength region ($-\Delta\lambda_2$) can be viewed by the transmitted light in the wavelength region ($-\Delta\lambda_2$).

In this way, as viewed from the side of the incident light, on the OFF-voltage application section, the light reflected by the polarization separator 21 becomes emitted light $P_1$ of the color in the wavelength region ($\Delta\lambda_1$), while on the ON-voltage application section, the light transmitted by the polarization separator 26 is reflected by the polarization separator 26 to become the emitted light $Q_1$ of the color in the wavelength region ($\Delta\lambda_2$). Therefore, as viewed from the side of the incident light, color display of the wavelength region ($\Delta\lambda_2$) can be obtained on the color ground of the wavelength region ($\Delta\lambda_1$).

In addition, as viewed from the side opposite to the side of the incident light, on the OFF-voltage application section, the light transmitted by the polarization separator 21 becomes emitted light $P_1$ of the color in the wavelength region ($-\Delta\lambda_1$), and on the ON-voltage application section, the light transmitted by the polarization separator 21 is also transmitted by the polarization separator 26 to become emitted light $Q_3$ of the color in the wavelength region ($-\Delta\lambda_2$). Therefore, as viewed from the side opposite to the side of the incident light, color display of the wavelength region ($-\Delta\lambda_2$) can be obtained on the color ground of the wavelength region ($-\Delta\lambda_1$).

Although a description is given taking the TN liquid crystal 8 as an example in the above description, the basic operating principle is equal even if the STN liquid crystal, the ECB (Electrically Controlled Birefringence) liquid crystal or the like, which is a component capable of changing the transmitted polarization axis by a voltage or the like, is used in place of the TN liquid crystal 8.

Figure 21:
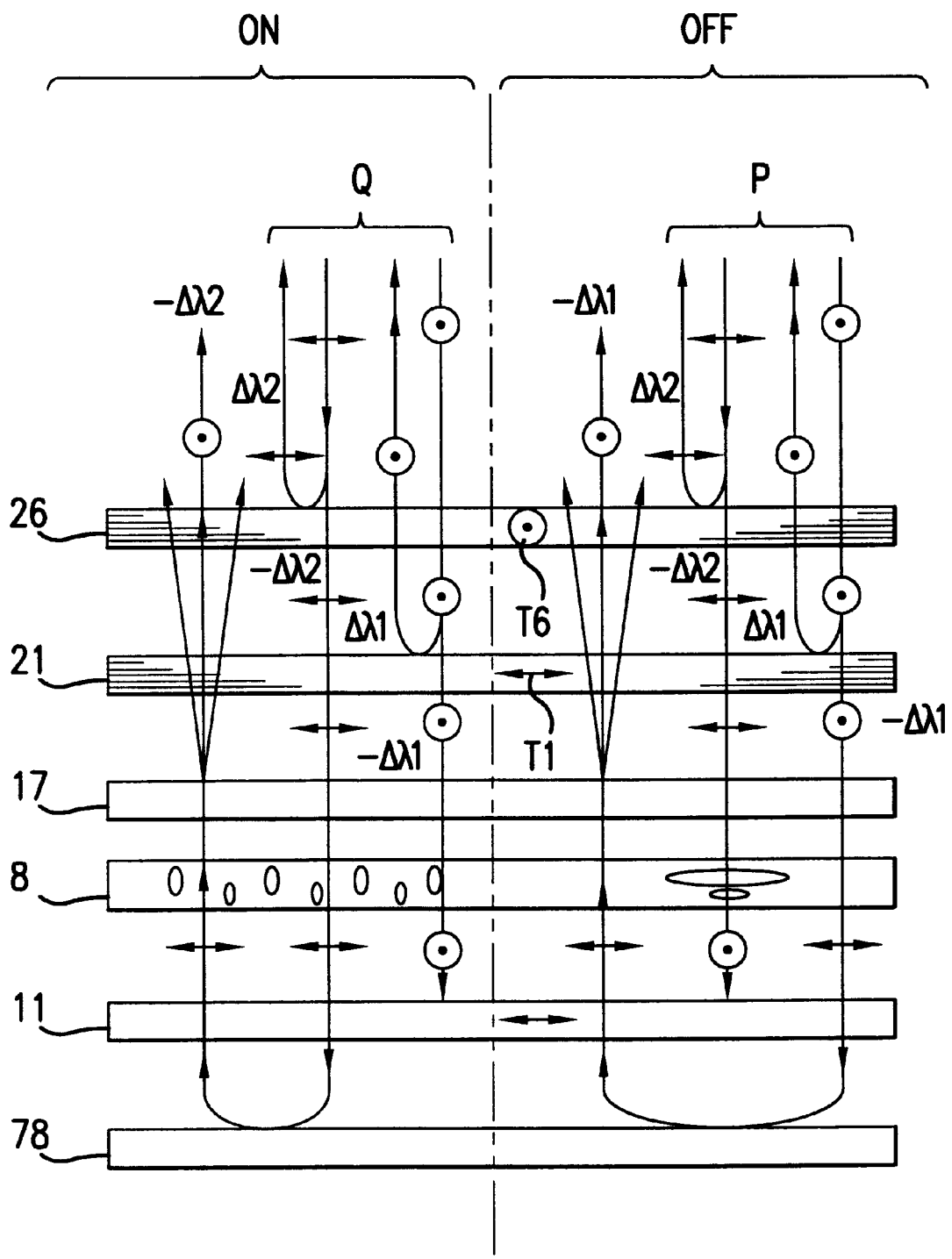
FIG. 21 is a view for explaining a principle of another example of the liquid crystal display device, which is a major component used in the electronic watch according to the present invention.
Figure 24:
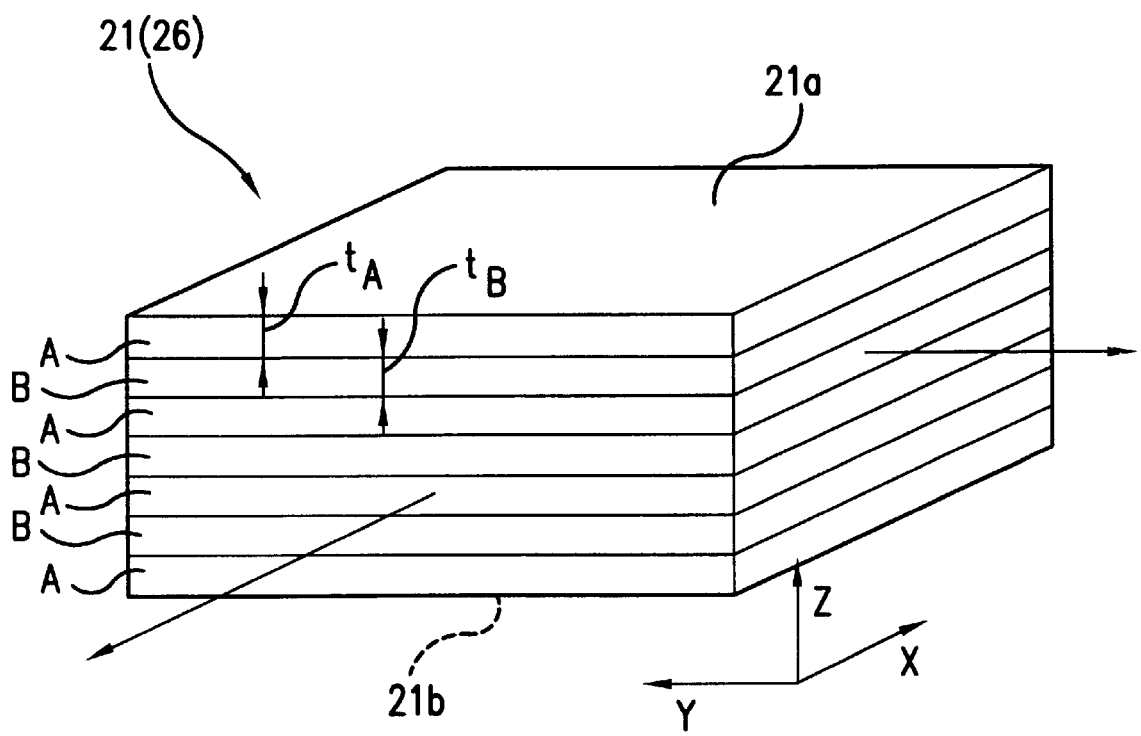
FIG. 24 is a perspective view showing schematically an example of a polarization separator, which is a major component used in the electronic watch according to the present invention.

FIG. 21 schematically shows another example of the liquid crystal display device using the polarization separator 21 of FIG. 24. In this liquid crystal display device, the TN liquid crystal 8 is used as the polarization changing element. The polarizer 11 and the reflecting plate 78 are provided on the lower side of the TN liquid crystal 8. The light-scattering layer 17, the polarization separator 21 and the polarization separator 26 are provided on the upper side of the TN liquid crystal 8 in this order.

The polarization separator 21 reflects light which is the light in the direction of the reflection axis and in a certain wavelength region ($\Delta\lambda_1$) and transmits light which is the light in the direction of the reflection axis and in other wavelength region ($-\Delta\lambda_1$). In addition, the polarization separator 26 reflects light which is the light in the direction of the reflection axis and in a certain wavelength region ($\Delta\lambda_2$) different from $\Delta\lambda_1$, and transmits light which is the light in the direction of the reflection axis and in other wavelength region ($-\Delta\lambda_1$). An angle formed by the transmission axis $T_1$ of the polarization separator 21 and the transmission axis $T_6$ of the polarization separator 26 is 90°.

On the OFF-voltage application section of the right side of FIG. 21, of the light P, light, which is in the direction perpendicular to the transmission axis $T_6$ of the polarization separator 26 and which is in the wavelength region ($-\Delta\lambda_2$), is transmitted by the polarization separator 26 as linearly polarized light. The transmitted light is changed by the polarization separator 21 to linearly polarized light in the direction parallel to the plane of the drawing and is transmitted thereby. The polarization direction of this transmitted light is twisted 90° by the TN liquid crystal 8 to become linearly polarized light in the direction perpendicular to the plane of the drawing, and is absorbed by the polarizer 11.

On the other hand, of the light P, light in the direction parallel to the transmission axis $T_6$ of the polarization separator 26 is transmitted by the polarization separator 26 as linearly polarized light. The light, which is transmitted and in the wavelength region $(-\Delta\lambda_1)$, is changed by the polarization separator 21 to linearly polarized light in the direction perpendicular to the plane of the drawing, and is transmitted thereby. The polarization direction of this transmitted light is twisted 90° by the TN liquid crystal 8 to become linearly polarized light in the direction parallel to the plane of the drawing, and is transmitted by the polarizer 11 and reflected by the reflecting plate 78. This reflected light passes through the polarizer 11, the TN liquid crystal 8, the polarization separator 21 and the polarization separator 26 again. In the middle of passing, the light is diffused by the light-scattering layer 17 and therefore, a color of the wavelength region $(-\Delta\lambda_1)$ can be viewed in a wide visual angle.

While on the ON-voltage application section, of the light Q, light, which is in the direction perpendicular to the transmission axis $T_6$ of the polarization separator 26 and in the wavelength region $(-\Delta\lambda_2)$, is transmitted by the polarization separator 26 as the linearly polarized light. The transmitted light is changed by the polarization separator 21 to linearly polarized light in the direction parallel to the plane of the drawing and is transmitted thereby. This transmitted light becomes linearly polarized light in the direction parallel to the plane of the drawing without a change in the polarization direction by the TN liquid crystal 8, and is transmitted by the polarizer 11 and reflected from the reflecting plate 78. This reflected light passes through the polarizer 11, the TN liquid crystal 8, the polarization separator 21 and the polarization separator 26 again. In the middle of passing, the light is diffused by the light-scattering layer 17 and therefore, a color in the wavelength region $(-\Delta\lambda_2)$ can be viewed in a wide visual angle.

On the other hand, of the light Q, light in the direction parallel to the transmission axis $T_6$ of the polarization separator 26 is transmitted by the polarization separator 26 as linearly polarized light. The light, which is transmitted and in the wavelength region $(-\Delta\lambda_1)$, is changed by the polarization separator 21 to linearly polarized light in the direction perpendicular to the plane of the drawing, and is transmitted thereby. The transmitted light becomes linearly polarized light without a change in the polarization direction by the TN liquid crystal 8, and is absorbed by the polarizer 11.

In this way, on the OFF-voltage application section, a color in the wavelength region $(-\Delta\lambda_1)$ can be viewed, and a color in the wavelength region $(-\Delta\lambda_2)$ can be viewed on the ON-voltage application section.

Figure 22:
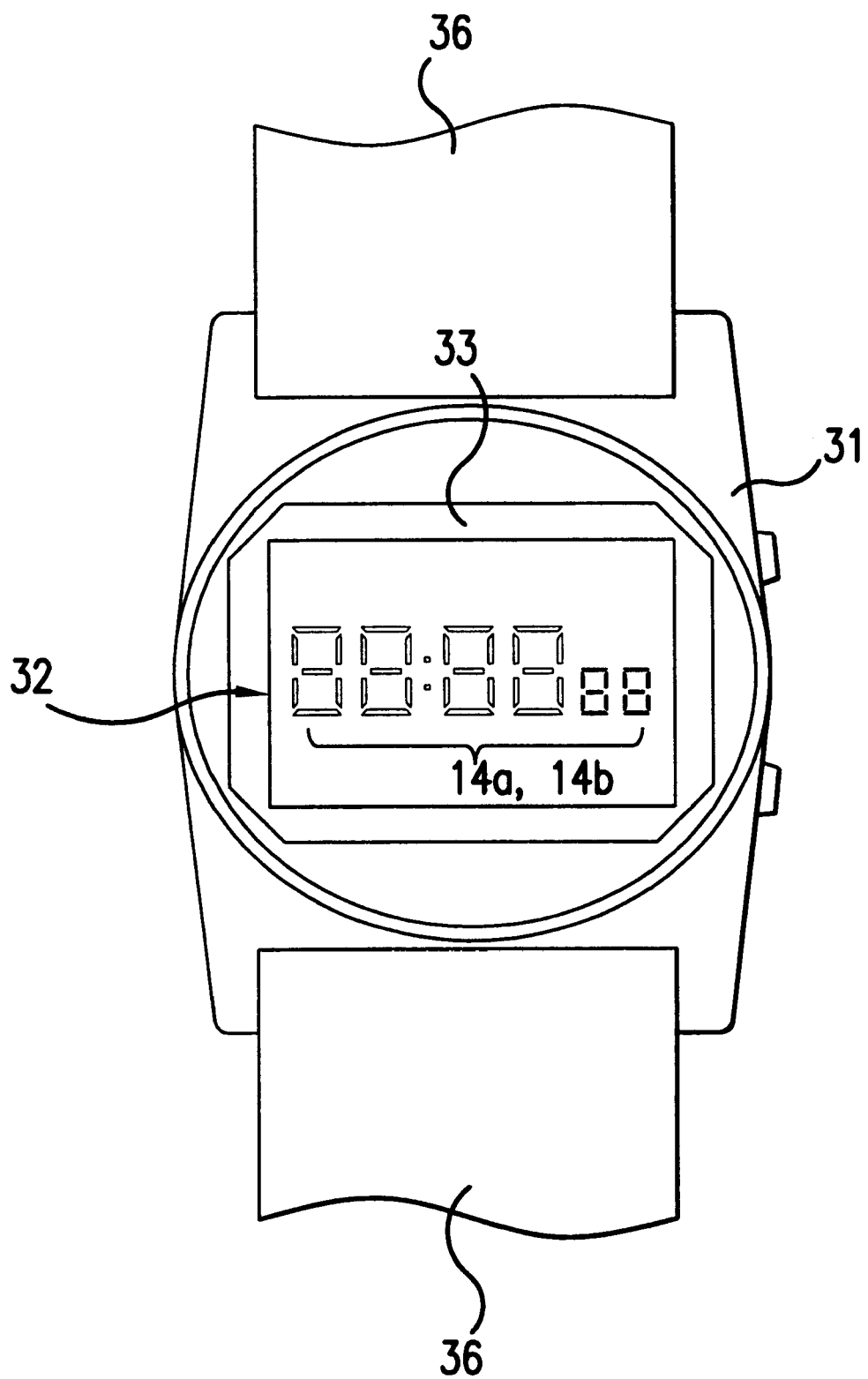
FIG. 22 is a front view showing an embodiment of the electronic watch according to the present invention.

FIG. 22 shows another embodiment of the electronic watch. This electronic watch is composed of a casing 31, a movement 32 stored in the casing 31, a glass plate 33 for use in covering which is fixed to the casing 31 and located on the movement 32, and a wristband 36 fitted to the casing 31. Since the cross-sectional configuration of this electronic watch is the same as the configuration shown in FIG. 4, a description thereof will be omitted.

Figure 23:
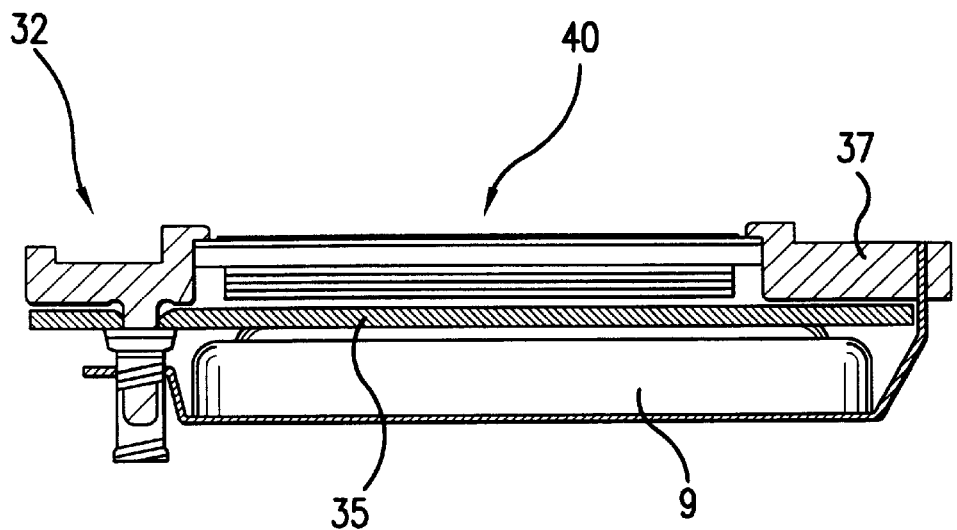
FIG. 23 is a cross-sectional view showing a major part of an internal structure of the electronic watch of FIG. 22.
Figure 25:
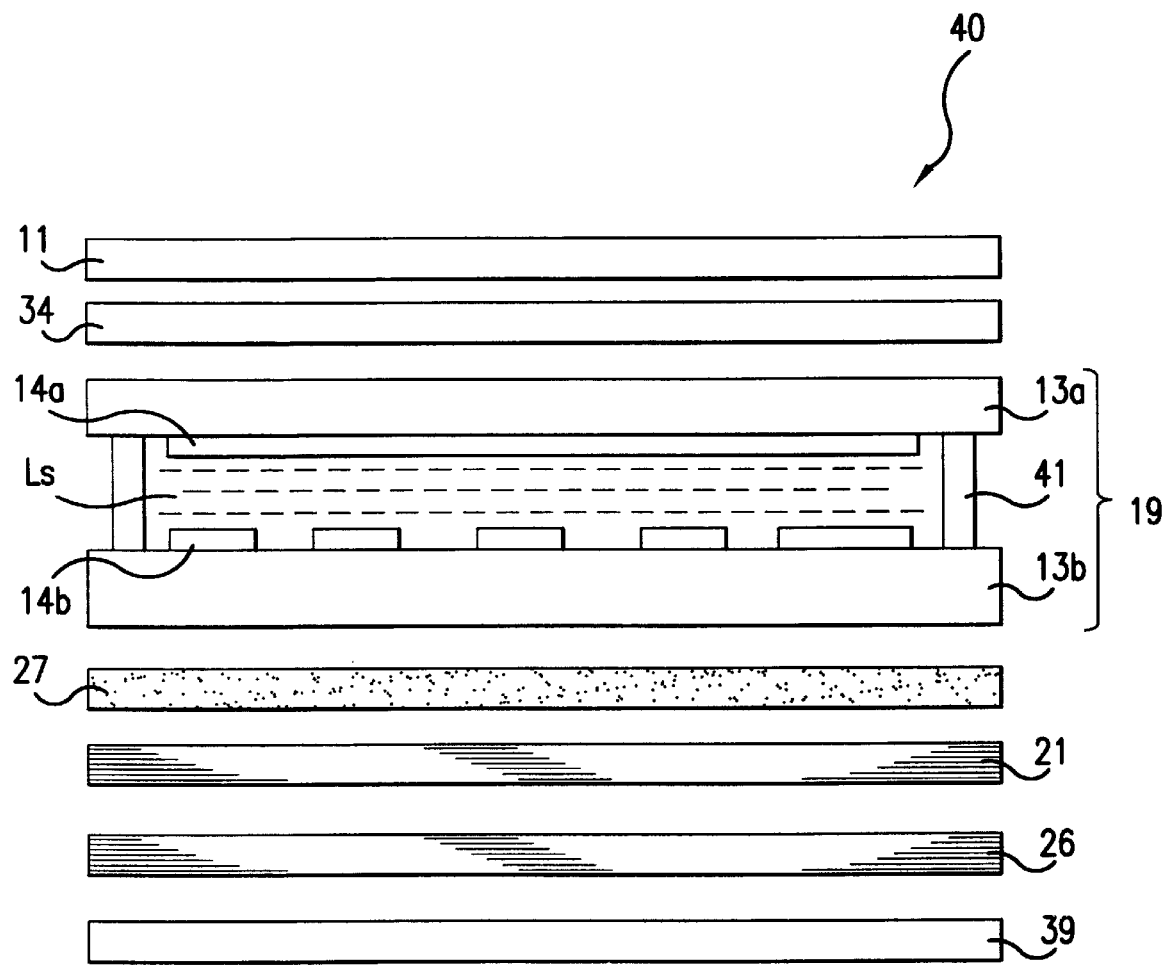
FIG. 25 is a view showing schematically the cross-sectional configuration of an embodiment of a liquid crystal display device, which is a major component used in the electronic watch according to the present invention.

The movement 32 is composed of, as shown in FIG. 23, a panel frame 37, a liquid crystal display device 40 supported by the panel frame 37, a circuit substrate 35 and the battery 9. The liquid crystal display device 40 uses, as shown in FIG. 25, the STN liquid crystal panel 19 as the polarization changing element. A retardation film 34 and the polarizer 11 are provided on the upper side of the STN liquid crystal panel 19 in this order. A diffusing plate 27, the polarization separator 21, the polarization separator 26 and a light absorber 39 are provided on the lower side of the STN liquid crystal panel 19 in this order.

As the polarization separator 21 and the polarization separator 26, the polarization separators which are described using FIG. 24 are used. However, the polarization separator 21 is the polarization separator for holding the previously described expression, $t_A \cdot n_{AX} + t_B \cdot n_{BX} = \lambda/2$ regarding only a specific wavelength region $(\Delta\lambda_3)$ in the visible light, for transmitting linearly polarized light in the Y direction as the linearly polarized light in the Y direction, for reflecting light in the wavelength region $(\Delta\lambda_3)$ of linearly polarized light in the X direction as the linearly polarized light in the X direction, and for transmitting light in the wavelength region $(-\Delta\lambda_3)$ other than the wavelength region $(\Delta\lambda_3)$ of linearly polarized light in the X direction as the linearly polarized light in the X direction.

In addition, the polarization separator 26 is the polarization separator for holding the previously described expression, $t_A \cdot n_{AX} + t_B \cdot n_{BX} = \lambda/2$ regarding only a specific wavelength region $(\Delta\lambda_4)$ in the visible light, for transmitting linearly polarized light in the Y direction as the linearly polarized light in the Y direction, for reflecting light in the wavelength region $(\Delta\lambda_4)$ of linearly polarized light in the X direction as the linearly polarized light in the X direction, and for transmitting light in the wavelength region $(-\Delta\lambda_4)$ other than the wavelength region $(\Delta\lambda_4)$ of linearly polarized light in the X direction as the linearly polarized light in the X direction. Incidentally, an angle formed by the transmission axis of the polarization separator 21 and the transmission axis of the polarization separator 26 is 90°.

In the STN liquid crystal panel 19, the STN liquid crystal $L_s$ is sealed in a cell formed by two sheets of the glass substrates 13a and 13b and a sealing member 41. The transparent electrode 14a is provided on the lower surface of the glass substrate 13a, and the transparent electrode 14b is provided on the upper surface of the glass substrate 13b. As the transparent electrodes 14a and 14b, ITO (Indium Tin Oxide) and stannic oxide can be used.

In the case of this embodiment, these transparent electrodes 14a and 14b are formed, as shown in FIG. 22, as a watch displaying pattern in a state where a one-digit numeric character formed by seven segments is arranged in six digits. By selectively changing the color in some of the segments, various numeric characters for displaying a time are displayed. Of course, all information except the numeric characters can be displayed, but it will be omitted in the following description.

In FIG. 25, the retardation film 34 is used as a color compensating optical anisotropic body, and is used to correct coloring caused in the STN liquid crystal panel 19. In addition, the light absorber 39 is a black film.

The operation of the electronic watch constructed as described above will be described as follows.

On the OFF-voltage application region, natural light becomes linearly polarized light in a predetermined direction due to the action of the polarizer 11 and thereafter, becomes linearly polarized light of which polarization direction is twisted at a predetermined angle by the STN liquid crystal panel 19. The light in the wavelength region $(\Delta\lambda_3)$ is reflected by the polarization separator 21 without being absorbed thereby. The polarization direction is twisted at a predetermined angle by the STN liquid crystal panel 19. Then, the light in the wavelength region $(\Delta\lambda_3)$ is emitted from the polarizer 11 as linearly polarized light.

In addition, the light in the wavelength region $(-\Delta\lambda_3)$ is transmitted by the polarization separator 21 and the polarization separator 26, and is absorbed by the light absorber 39. In this way, when the OFF-voltage is applied, the light is not absorbed but reflected by the polarization separator 21, so that a bright display color can be obtained regarding the wavelength region ($\Delta\lambda_3$). Incidentally, since the diffusing plate 27 is provided between the STN liquid crystal panel 19 and the polarization separator 21, the reflected light from the polarization separator 21 is not changed into the form of a mirror surface.

On the other hand, on the ON-voltage application region, the natural light is changed to linearly polarized light in a predetermined direction by the action of the polarizer 11 and transmitted by the STN liquid crystal panel 19 and the diffusing plate 27 as linearly polarized light. The natural light is also transmitted by the polarization separator 21 as linearly polarized light. Of the transmitted linearly polarized light, light in the wavelength ($\Delta\lambda_4$) is reflected by the polarization separator 26 and the reflected light is transmitted by the polarization separator 21, the diffusing plate 27, the STN liquid crystal panel 19 and the polarizer 11 as linearly polarized light. In addition, light in the wavelength region ($-\Delta\lambda_4$) is transmitted by the polarization separator 26 to be absorbed by the light absorber 39.

In this way, when the ON-voltage is applied, the light is not absorbed but reflected by the polarization separator 21 and the polarization separator 26, so that a bright display color regarding the wavelength region ($\Delta\lambda_4$) can be obtained. Incidentally, since the diffusing plate 27 is provided between the STN liquid crystal panel 19 and the polarization separator 21, the reflected light from the polarization separator 21 is not changed into the form of a mirror surface. According to the foregoing description, the display color of the wavelength region ($\Delta\lambda_3$) and the display color of the wavelength region ($\Delta\lambda_4$) can be switched.

Tenth Embodiment

In the above-described ninth embodiment (FIG. 25), if the angle formed by the polarization axes of the polarization separator 21 and the polarization separator 26 is taken as θ, then θ is 90° in the above-described tenth embodiment. When the angle θ is changed sequentially, the color contrast becomes better as the angle θ increases from 0°. When the angle θ becomes 45°, a practical level is obtained. A display state is fairly improved when the angle θ becomes 60°. Further, a high-level color purity is obtained when the angle θ becomes 90°.

Eleventh Embodiment

Figure 26:
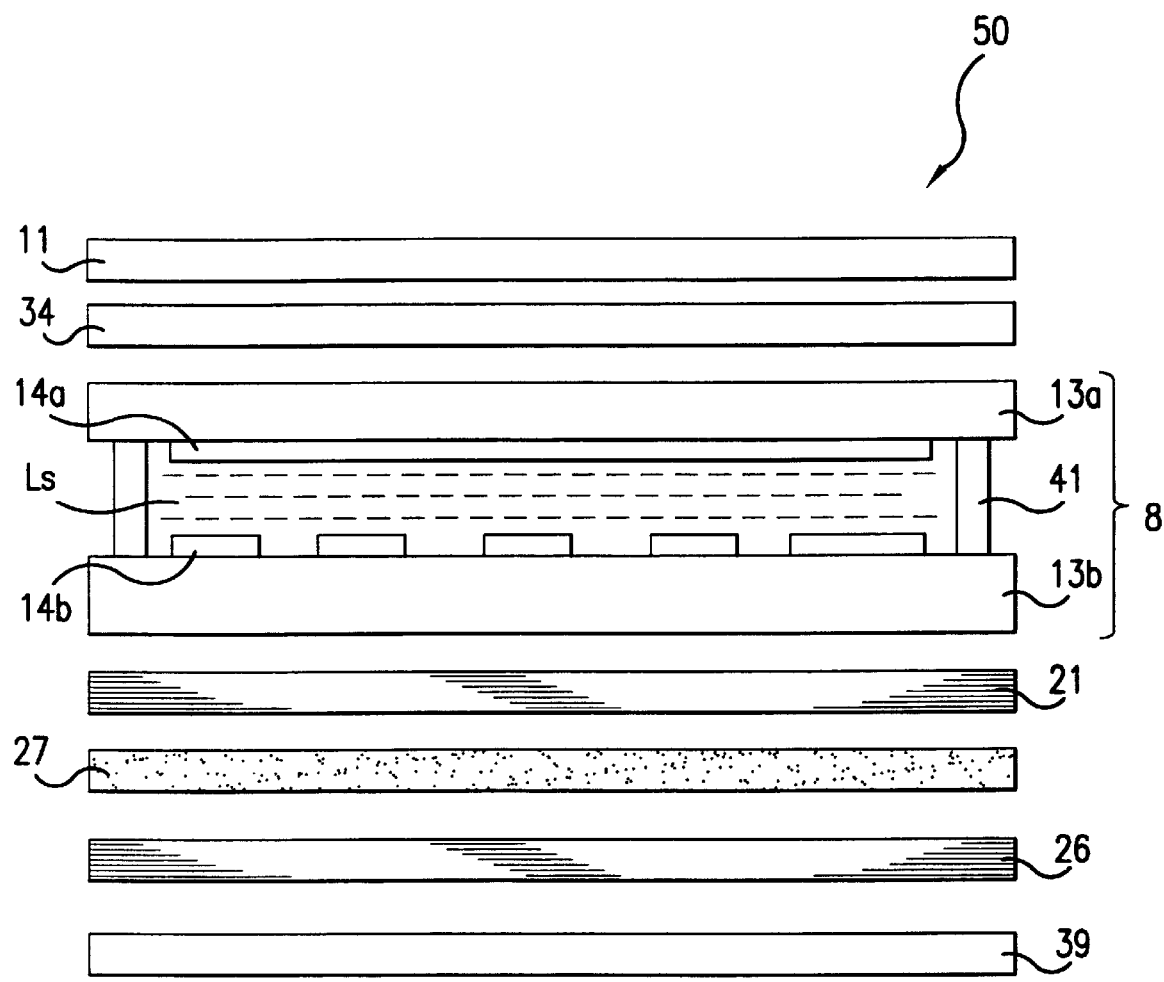
FIG. 26 is a view showing schematically the cross-sectional configuration of another embodiment of the liquid crystal display device, which is a major component used in the electronic watch according to the present invention.

FIG. 26 shows another embodiment of a major part used in the electronic watch, especially, a liquid crystal display device. A liquid crystal display device 50 differs from the liquid crystal display device 40 shown in FIG. 25 in that the diffusing plate 27 is provided between the polarization separator 21 and the polarization separator 26. In this embodiment, the wavelength region ($\Delta\lambda_3$) of the polarization separator 21 may be taken as yellow, and the wavelength region ($\Delta\lambda_4$) of the polarization separator 26 as blue. Thus, a blue display and a display of metallic shiny yellow, i.e., gold could be switched.

Twelfth Embodiment

Figure 27:
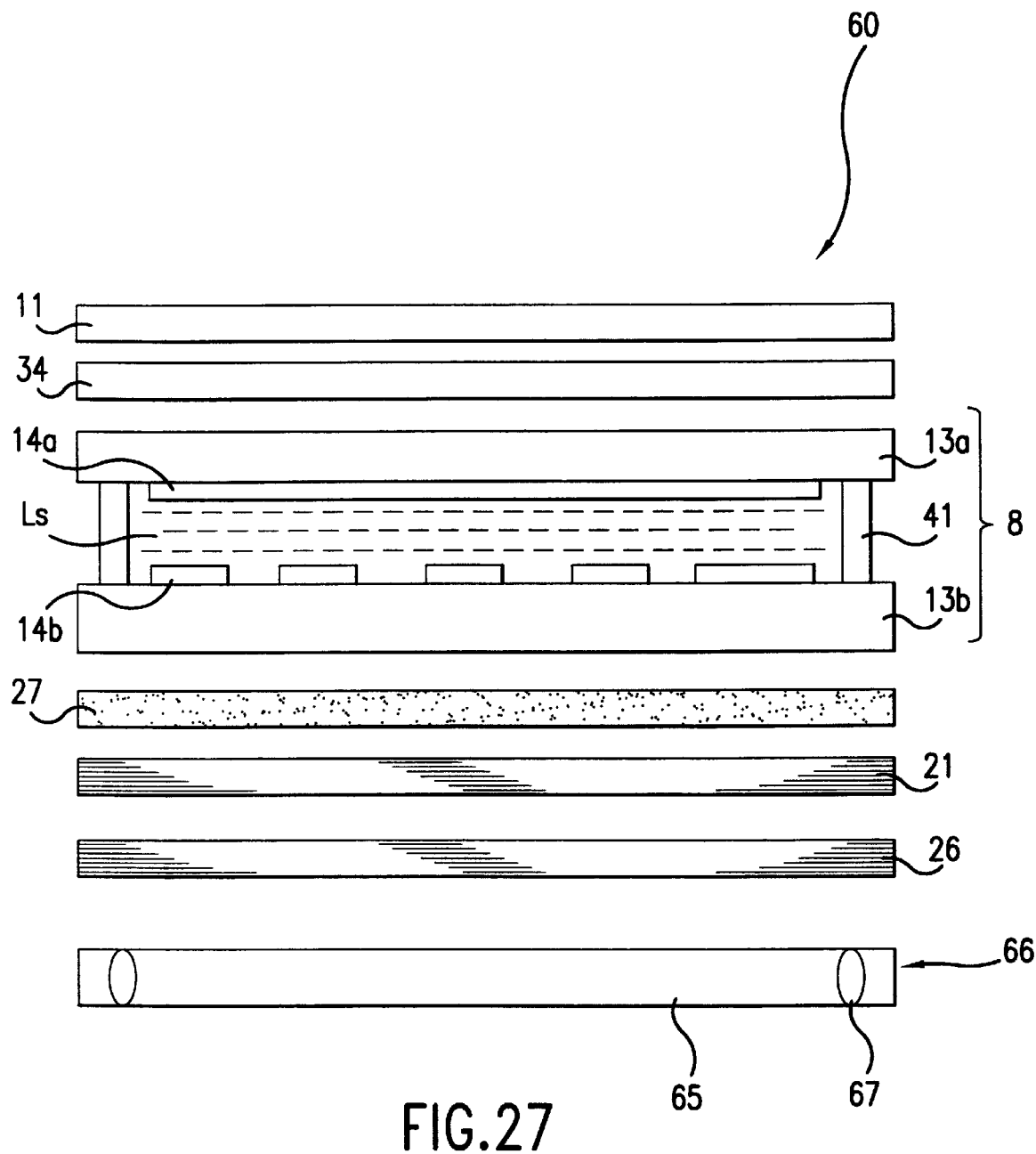
FIG. 27 is a view showing schematically the cross-sectional configuration of a further embodiment of the liquid crystal display device, which is a major component used in the electronic watch according to the present invention.
Figure 28:
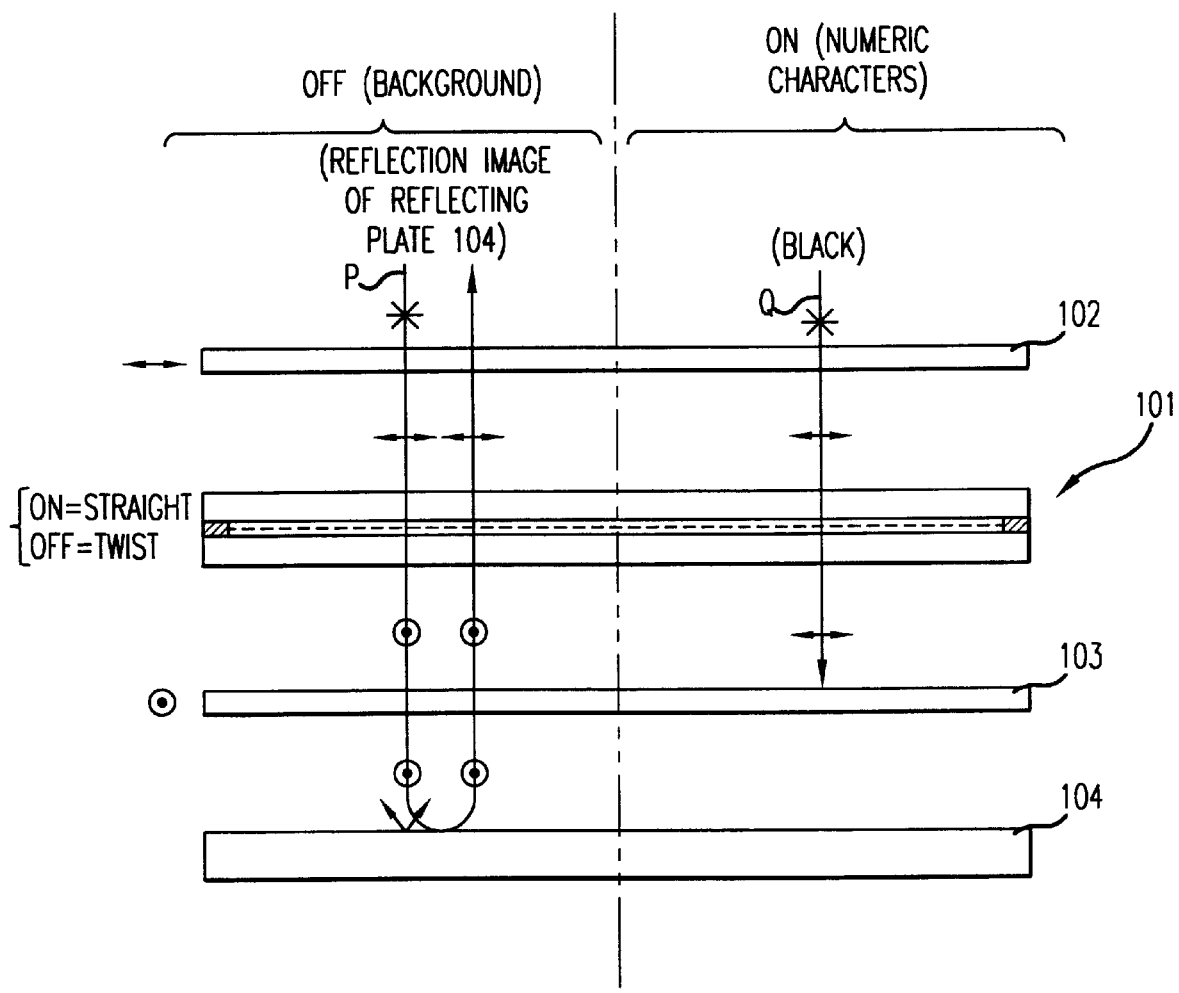
FIG. 28 is a view showing schematically a main part of an example of a conventional display device.

FIG. 27 shows a further embodiment of a major part used in the electronic watch of the present invention, especially, a liquid crystal display device. A liquid crystal display device 60 differs from the liquid crystal display device 40 shown in FIG. 25 in that a light source 66 is provided in place of the light absorber 39. The light source 66 uses an LED (light Emitting Diode) 67, and guides the light emitted from the LED 67 with a light guide 65 to emit to the outside from the top surface.

Under external light, similar to the embodiment of FIG. 25, the display color of the wavelength region ($\Delta\lambda_3$) and the display color of the wavelength region ($\Delta\lambda_4$) can be switched. In addition, under illumination of the light source 66, the light incident on the polarization separator 26 is transmitted by the polarization separator 26 and the polarization separator 21, whereby linearly polarized light in the wavelength region ($-\Delta\lambda_3$) and linearly polarized light in the wavelength region ($-\Delta\lambda_4$) can be obtained intersecting at right angles. By switching the polarization state of these linearly polarized light with the use of the STN liquid crystal 8, the display color of the wavelength region ($-\Delta\lambda_3$) and the display color of the wavelength region ($-\Delta\lambda_4$) can be switched.

Thirteenth Embodiment

In the embodiment shown in FIG. 26, the retardation film 34 was omitted. Thus, a brighter blue display and gold display could be obtained.

According to the display device and the electronic watch of the present invention, a polarization separation component for effecting action of transmitting linearly polarized light in one direction and reflecting linearly polarized light other than the above polarized light is employed as the second polarization separator in place of a normal polarizer, so that both information such as numeric characters or the like and the background color can be displayed in a remarkably bright and easy-to-see state.

In addition, the pattern, such as a logo, a mark, a character or the like is provided on the reflecting layer, so that the background in the display surface can be varied as compared with a conventional background of a single color with no pattern, thereby providing various information to the viewer, or strongly attracting the viewer's interest.

According to the display device and the electronic watch of the present invention, a polarization separation component for effecting action of transmitting linearly polarized light in one direction and reflecting linearly polarized light other than the above polarized light is employed as the second polarization separator in place of a normal polarizer, so that both information such as numeric characters or the like and the background color can be displayed in a remarkably bright and easy-to-see state.

In addition, the reflected light from the light-reflecting layer arranged on the back of the second polarization separator can be sufficiently guided to the outside without being attenuated, so that a variety of backgrounds can be clearly definitely recognized if the light-reflecting layer is contrived. In particular, according to the present invention, the light-reflecting layer is formed by a sheet material of which visually recognized condition is changed in accordance with a viewing angle. Thus, various backgrounds and so forth can be viewed every time the viewer changes the viewing angle, and hence, the viewer can enjoy a variety of watch display and so forth as compared with a conventional background of a single color with no pattern.

According to the electronic watch of the present invention, even if the electronic watch is placed under a dark environment such as nighttime, the display surface of the watch can be displayed brightly to the outside utilizing emitted light from the light-accumulative luminescent layer of the light-reflecting member. Moreover, since the light-accumulative luminescent layer does not require a specific power source and has a thin thickness, the electronic watch can be manufactured in small size at a low cost.

According to the electronic watch of the present invention, the first display state and the second display state can be obtained in response to the state of the transmitted polarization axis used for displaying information such as numeric characters or the like. Since the display color of the first state and the display color of the second state differ from each other, the watch display can be effected by the two colors. In addition, since both of the display states are the display states due to the light reflected from a polarization separator, the remarkably bright watch display can be obtained as compared with a conventional display element of a type for transmitting two sheets of polarizers.

What is claimed is:

1. A display device, comprising:
   a first polarization separator that transmits linearly polarized light polarized in a first direction and that does not transmit linearly polarized light polarized in a direction perpendicular to the first direction;
   a polarization changing element disposed at a position to receive the linearly polarized light transmitted from the first polarization separator, the polarization changing element selecting between one of a changing state and a non-changing state of a polarization of the transmitted linearly polarized light;
   a second polarization separator placed opposite to said first polarization separator with the polarization changing element interposed therebetween, the second polarization separator transmits linearly polarized light polarized in a second direction and reflects linearly polarized light polarized in a direction perpendicular to the second direction; and
   a light-reflecting layer that reflects light, placed opposite to said polarization changing element with the second polarization separator interposed therebetween;
   the light-reflecting layer including a pattern on a light-reflecting surface.

2. An electronic timepiece comprising:
   a first polarization separator that transmits linearly polarized light polarized in a first direction and that does not transmit linearly polarized light polarized in a direction perpendicular to the first direction;
   a polarization changing element disposed at a position to receive the linearly polarized light transmitted from the first polarization separator, the polarization changing element selecting between one of a changing state and a non-changing state of a polarization of the transmitted polarized light;
   a second polarization separator placed opposite to said first polarization separator with the polarization changing element interposed therebetween, the second polarization separator transmitting linearly polarized light polarized in a second direction and reflecting linearly polarized light polarized in a direction perpendicular to the second direction; and
   a light-reflecting layer that reflects light, placed opposite to said polarization changing element with the second polarization separator interposed therebetween;
   the light-reflecting layer including a pattern on a light-reflecting surface.

3. The electronic timepiece according to claim 2, wherein said pattern is formed on the light-reflecting layer by printing.

4. The electronic timepiece according to claim 2, wherein said pattern is a logo, a mark or a character.

5. The electronic timepiece according to claim 2, the light-reflecting layer including a fluorescent material.

6. The electronic timepiece according to claim 2, wherein the first polarization separator is rotatable in relation to the polarization changing element.

7. The electronic timepiece according to claim 6, further comprising:
   a casing for surrounding the first polarization separator, the polarization changing element, the second polarization separator and the light-reflecting layer; and
   a rotary ring rotatably mounted to the casing, said first polarization separator being integrally rotated with said rotary ring.

8. The electronic timepiece according to claim 2, wherein the light-reflecting layer is movable in relation to the second polarization separator.

9. The electronic timepiece according to claim 2, said second polarization separator having a multilayered structure in which two types of layers are alternately laminated;
   two adjacent ones of the layers having a same refractive index in one direction and having a different refractive index in a direction perpendicular to said one direction; and
   said plurality of layers having varying thicknesses from layer to layer.

10. A display device, comprising:
    a first polarization separator that transmits linearly polarized light polarized in a first direction and that does not transmit linearly polarized light polarized in a direction perpendicular to the first direction;
    a polarization changing element disposed at position to receive the linearly polarized light transmitted from the first polarization separator, the polarization changing element selects one of a changing state and a non-changing state of a polarization of the transmitted linearly polarized light;
    a second polarization separator, placed opposite to said first polarization separator with the polarization changing element interposed therebetween, the second polarization separator transmits linearly polarized light polarized in a second direction and reflects linearly polarized light polarized in a direction perpendicular to the second direction; and
    a light-reflecting layer that reflects light, placed opposite to said polarization changing element with the second polarization separator interposed therebetween;
    the light-reflecting layer having characteristics such that a visually recognized state is changed in response to a viewing angle.

11. An electronic timepiece comprising:
    a first polarization separator that transmits linearly polarized light polarized on a first direction and that does not transmit linearly polarized light polarized in a direction perpendicular to the first direction;
    a polarization changing element disposed at a position to receive the linearly polarized light transmitted from the first polarization separator, the polarization changing element selecting between one of a changing state and a non-changing state of a polarization of the transmitted linearly polarized light;
    a second polarization separator, placed opposite to said first polarization separator with the polarization changing element interposed therebetween, the second polarization separator transmitting linearly polarized light polarized in a second direction and reflecting linearly polarized light polarized in a direction perpendicular to the second direction; and
    a light-reflecting layer that reflects light, placed opposite to said polarization changing element with the second polarization separator interposed therebetween;
    the light-reflecting layer having characteristics such that a visually recognized state is changed in response to a viewing angle.

12. The electronic timepiece according to claim 11, the light-reflecting layer including a Fresnel lens.

13. The electronic timepiece according to claim 11, the light-reflecting layer including a rugged geometrical pattern.

14. The electronic timepiece according to claim 11, the light-reflecting layer including a hologram sheet.

15. The electronic timepiece according to claim 11, the light-reflecting layer including a hologram sheet having a mosaic pattern, and hologram characteristics of respective pattern portions of the mosaic pattern having variations.

16. The electronic timepiece according to claim 11, said second polarization separator having a multilayered structure in which two types of layers are alternately laminated;
   two adjacent ones of the layers having a same refractive index in one direction and having a different refractive index in a direction perpendicular to said one direction; and
   said plurality of layers having varying thicknesses from layer to layer.

17. The electronic timepiece, comprising:
   a first polarization separator that transmits linearly polarized light polarized in a first direction and that does not transmit linearly polarized light polarized in a direction perpendicular to the first direction;
   a polarization changing element disposed at a position to receive the linearly polarized light transmitted from the first polarization separator, the polarization changing element selecting between one of a changing state and a non-changing state of a polarization of the transmitted linearly polarized light;
   a second polarization separator placed opposite to said first polarization separator with the polarization changing element interposed therebetween, the second polarization separator transmitting linearly polarized light polarized in a second direction and reflecting linearly polarized light polarized in a direction perpendicular to the second direction; and
   a light-reflecting layer that reflects light, placed opposite to said polarization changing element with the second polarization separator interposed therebetween;
   the light-reflecting layer including a light-accumulative luminescent layer accumulating light as energy when an outside is bright, and emitting the accumulated energy as light when an outside is dark.

18. The electronic timepiece according to claim 17, said first polarization separator transmitting linearly polarized light polarized in a third direction and absorbing linearly polarized light polarized in a direction perpendicular to said third direction; and
   said second polarization separator transmitting linearly polarized light polarized in a fourth direction and reflecting linearly polarized light in a direction perpendicular to said fourth direction.

19. The electronic timepiece according to claim 17, said light-accumulative luminescent layer holding electrons excited by absorbed light in its excited state, and including a substance which causes light emission by recombination of the held electrons and positive holes.

20. The electronic timepiece, comprising:
   a polarization changing element that changes a polarization direction;
   a first polarization separator having first and second sides and a second polarization separator having third and fourth sides, the first and second polarization separators placed on opposite sides of the polarization changing element; and
   a third polarization separator having fifth and sixth sides, the third polarization separator placed opposite to said polarization changing element with respect to the second polarization separator;
   said first polarization separator emitting, in a first direction, linearly polarized light incident on the first side to the second side and emitting, in the first direction, linearly polarized light incident on the second side to said first side;
   said second polarization separator transmitting, linearly polarized light incident on said third side, as linearly polarized light in a second direction, reflecting to said third side linearly polarized light in a first wavelength region of the light incident on said third side, in a third direction perpendicular to said second direction, as linearly polarized light in said third direction, and emitting to said fourth side, a linearly polarized light in a second wavelength region of the light incident on said third side, as linearly polarized light in a third direction; and
   said third polarization separator transmitting to the sixth side, linearly polarized light incident on said fifth side, as linearly polarized light in a fourth direction, reflecting to said fifth side linearly polarized light in a third wavelength region of the light incident on said fifth side, as linearly polarized light in a fifth direction, perpendicular to said fourth direction, and emitting to the sixth side, linearly polarized light in a fourth wavelength region of the light incident on said fifth side in said fifth direction.

21. The electronic timepiece according to claim 20, said polarization changing element including a liquid crystal display device.

22. The electronic timepiece according to claim 21, wherein said liquid crystal display device is a TN liquid crystal device, an STN liquid crystal device, or an ECB liquid crystal device.

23. The electronic timepiece according to claim 20, said first polarization separator including a polarizer.

24. The electronic timpiece according to claim 20, wherein an angle formed by said second direction and said fourth direction is 45° to 90°.

25. The electronic timepiece according to claim 20, wherein an angle formed by said second direction and said fourth direction is 60° to 90°.

26. The electronic timepiece according to claim 20, wherein an angle formed by said second direction and said fourth direction is 75° to 90°.

27. The electronic timepiece according to claim 20, further comprising a light-diffusing element.

28. The electronic timepiece according to claim 20, further comprising a light-absorber.

29. The electronic timepiece according to claim 20, further comprising a light source.

30. The electronic timepiece according to claim 20, said second polarization separator being a laminated product in which a plurality of layers are laminated by being adhered to each other; and
   a refractive index of said plurality of layers being equal in a sixth direction between adjacent layers, and being different in a seventh direction perpendicular to the sixth direction.

31. The electronic timepiece according to claim 20, said third polarization separator being a laminated product in which a plurality of layers are laminated by being adhered to each other; and
   a refractive index of said plurality of layers being equal in an eighth direction between adjacent layers, and being in a ninth direction perpendicular to the eighth direction.

* * * * *